United States Patent
Hong et al.

(10) Patent No.: US 8,347,489 B2
(45) Date of Patent: Jan. 8, 2013

(54) METHOD FOR MANUFACTURING A PERPENDICULAR MAGNETIC WRITE HEAD HAVING A LEADING EDGE TAPERED WRITE POLE, SELF ALIGNED SIDE SHIELD AND INDEPENDENT TRAILING SHIELD

(75) Inventors: Liubo Hong, San Jose, CA (US); Aron Pentek, San Jose, CA (US); Yi Zheng, San Ramon, CA (US); Honglin Zhu, Fremont, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 181 days.

(21) Appl. No.: 12/874,116

(22) Filed: Sep. 1, 2010

(65) Prior Publication Data

US 2012/0050915 A1   Mar. 1, 2012

(51) Int. Cl.
*G11B 5/127* (2006.01)
*H04R 31/00* (2006.01)

(52) U.S. Cl. ............... 29/603.16; 29/603.12; 29/603.13; 29/603.14; 29/603.15; 29/603.18; 216/22; 216/39; 216/41; 216/48; 216/65; 360/121; 360/122; 360/317; 451/5; 451/41

(58) Field of Classification Search .. 29/603.12–603.16, 29/603.18; 216/22, 39, 41, 48, 65; 360/121, 360/122, 317; 451/5, 41
See application file for complete search history.

(56) References Cited

U.S. PATENT DOCUMENTS

| | | | |
|---|---|---|---|
| 7,071,009 B2 * | 7/2006 | Wang et al. | 438/3 |
| 7,100,266 B2 | 9/2006 | Plumer et al. | |
| 7,253,992 B2 | 8/2007 | Chen et al. | |
| 7,375,925 B2 | 5/2008 | Sasaki et al. | |
| 7,712,206 B2 | 5/2010 | Jiang et al. | |
| 8,000,059 B2 * | 8/2011 | Jiang et al. | 360/125.3 |
| 2008/0113090 A1 * | 5/2008 | Lam et al. | 427/123 |
| 2008/0259498 A1 | 10/2008 | Lengsfield et al. | |
| 2008/0266723 A1 | 10/2008 | Yazawa et al. | |
| 2008/0266724 A1 | 10/2008 | Yazawa et al. | |
| 2008/0278855 A1 | 11/2008 | Guthrie et al. | |
| 2008/0278861 A1 | 11/2008 | Jiang et al. | |
| 2009/0122445 A1 | 5/2009 | Jiang et al. | |
| 2009/0147410 A1 | 6/2009 | Jiang et al. | |
| 2009/0152119 A1 | 6/2009 | Tachibana et al. | |
| 2009/0162699 A1 | 6/2009 | Sasaki et al. | |
| 2009/0296275 A1 | 12/2009 | Sasaki et al. | |
| 2010/0061016 A1 | 3/2010 | Han et al. | |
| 2010/0155364 A1 * | 6/2010 | Pentek et al. | 216/11 |

FOREIGN PATENT DOCUMENTS

JP   2009/163836 A   7/2009
JP   2009/181641 A2   8/2009

* cited by examiner

*Primary Examiner* — Paul D Kim
(74) *Attorney, Agent, or Firm* — Zilka-Kotab, PC

(57) ABSTRACT

A method for manufacturing a magnetic write head having a tapered write pole as well as a leading edge taper, and independent trailing and side magnetic shields. The method allows the write pole to be constructed by a dry process wherein the write pole material is either deposited by a process such as sputter deposition or electrically plated and the write pole shape is defined by masking and ion milling. The write pole has a stepped feature that can either be used to provide increased magnetic spacing between the trailing shield and the write pole at a location slightly recessed from the ABS or can be magnetic material that increases the effective thickness of the write pole at a location slightly recessed from the ABS. A bump structure can be further built over that stepped feature to enhance field gradient as well as reduce trailing shield saturation.

22 Claims, 34 Drawing Sheets

METHOD FOR MANUFACTURING A PERPENDICULAR MAGNETIC WRITE HEAD HAVING A LEADING EDGE TAPERED WRITE POLE, SELF ALIGNED SIDE SHIELD AND INDEPENDENT TRAILING SHIELD

FIELD OF THE INVENTION

The present invention relates to perpendicular magnetic write heads and more particularly to a method for manufacturing a magnetic write head for perpendicular magnetic recording that has a write pole with a tapered leading edge, self aligned side shield and independent top shield.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head can include a magnetic write pole and a magnetic return pole, the write pole having a much smaller cross section at the ABS than the return pole. The magnetic write pole and return pole are magnetically connected with one another at a region removed from the ABS. An electrically conductive write coil induces a magnetic flux through the write coil. This results in a magnetic write field being emitted toward the adjacent magnetic medium, the write field being substantially perpendicular to the surface of the medium (although it can be canted somewhat, such as by a trailing shield located near the write pole). The magnetic write field locally magnetizes the medium and then travels through the medium and returns to the write head at the location of the return pole where it is sufficiently spread out and weak that it does not erase previously recorded bits of data.

A magnetoresistive sensor such as a GMR or TMR sensor can be employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

SUMMARY OF THE INVENTION

The present invention provides a method for manufacturing a magnetic write head. The method includes, depositing a magnetic write pole material and then forming a write pole defining mask structure over the magnetic write pole material. An ion milling is performed to remove a portion of the magnetic write pole material, thereby forming a magnetic write pole. A non-magnetic side gap material is then deposited, and a side shield defining mask is formed having an opening configured to define a side shield. A magnetic material is deposited into the opening in the side shield defining mask to form first and second magnetic side shields. Then, the side shield defining mask is removed and a non-magnetic fill layer is deposited. This is followed by a chemical mechanical polishing, and an ion milling to remove a portion of the non-magnetic side gap layer that extends over the write pole. A tapered trailing edge surface is then formed on the write pole. A non-magnetic trailing gap layer is then deposited, and a trailing shield is formed over the non-magnetic trailing gap layer.

This process advantageously allows us to build, an advanced write pole with a critical Leading Edge Taper (LET) and Tapered Writer Pole (TWP) features, which all can be formed by a dry process wherein the write pole material is deposited full film, such as by sputter deposition, or electrically plated high moment magnetic materials, and then formed by masking and ion milling, while still allowing the write pole to be formed with tapered trailing and leading edges. Also, the process advantageously allows the trailing and side shields to be constructed independently. This allows the side shield and trailing shield to be constructed of different materials and with different throat heights. For example, the side shields can be constructed of a material having a lower magnetic moment than the material used to construct the trailing shield.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
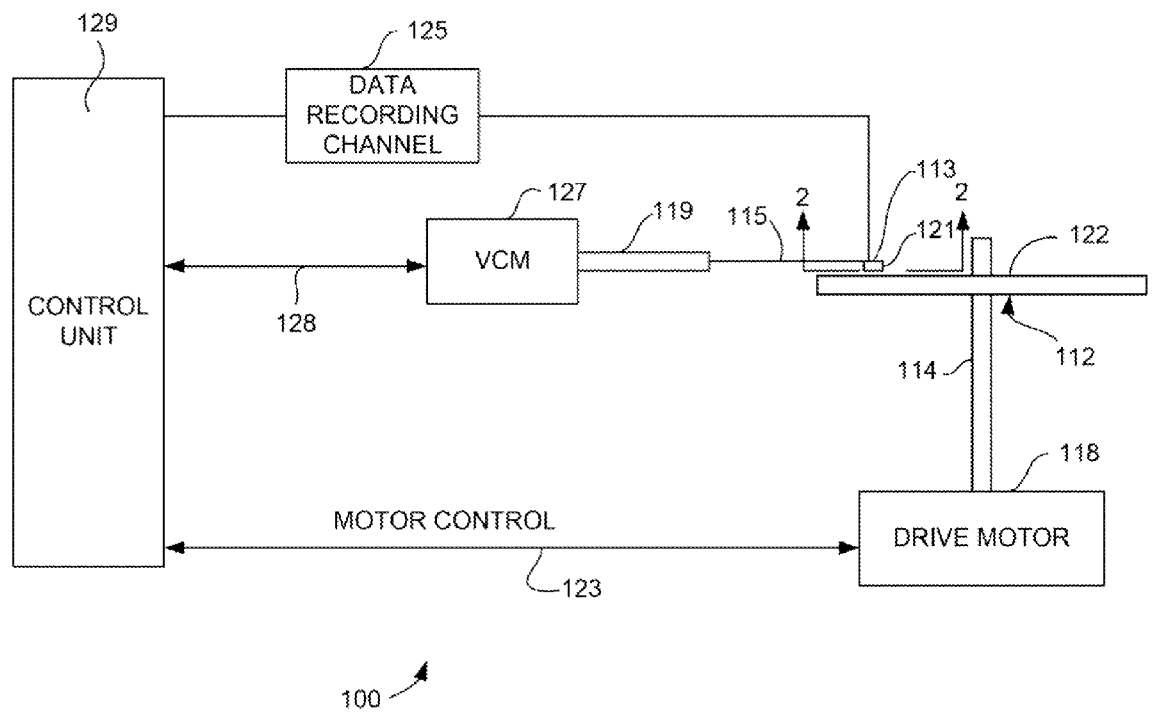
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
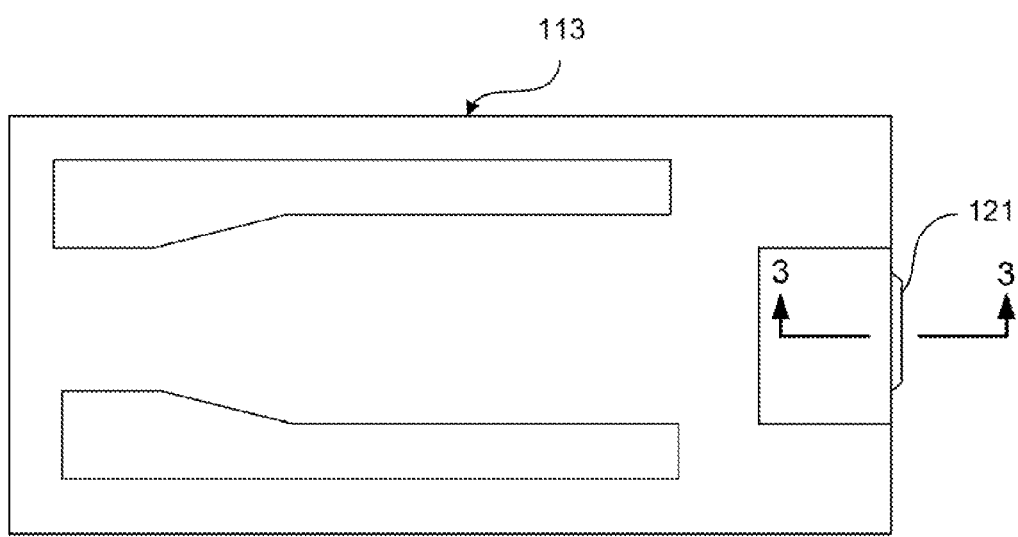
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
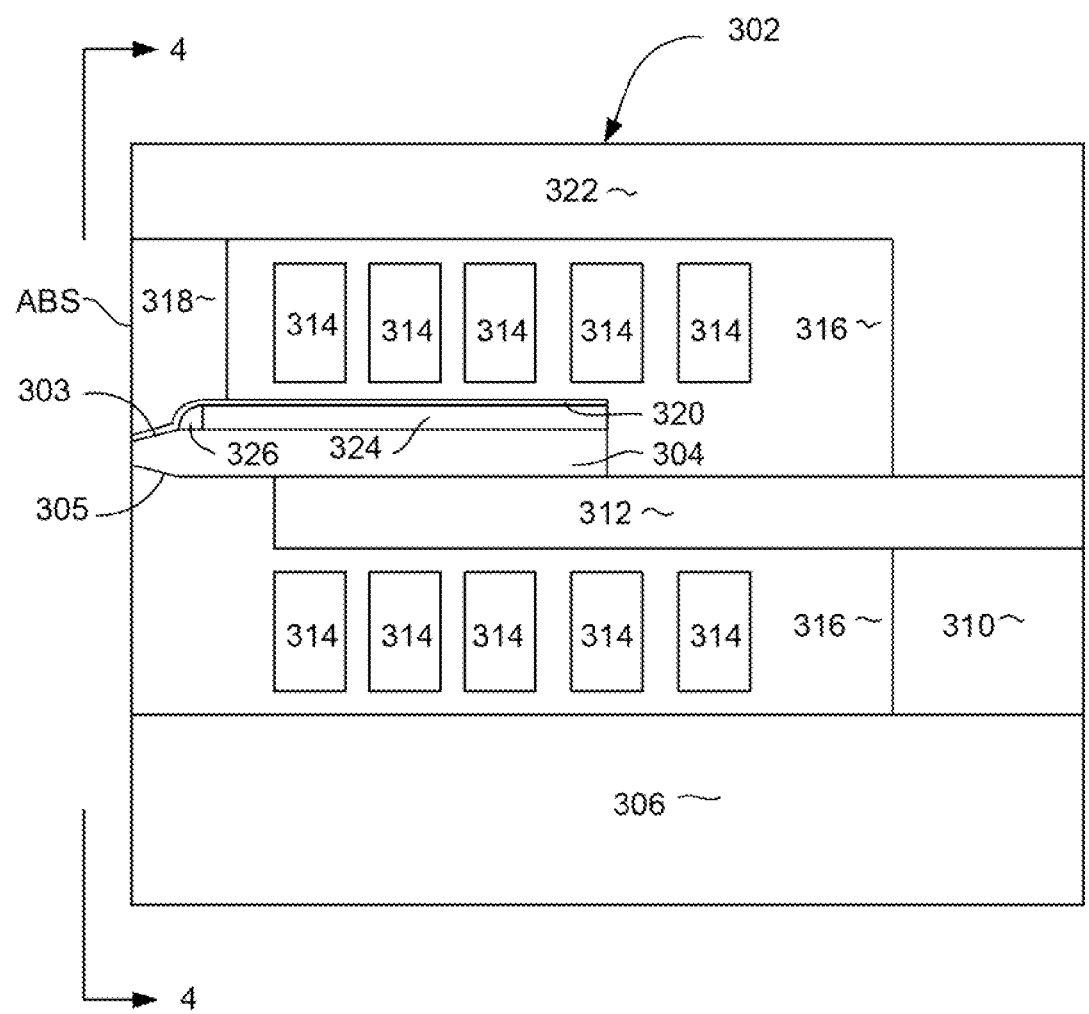
FIG. 3 is a cross sectional view of a magnetic head, taken from line 3-3 of FIG. 2 and rotated 90 degrees counterclockwise, of a magnetic head according to an embodiment of the present invention.

With reference now to FIG. 3, the invention can be embodied in a magnetic head 302, which is formed upon the trailing edge of the slider 113 (FIG. 2). The write head 302 includes a magnetic write pole 304 and a magnetic, return pole 306. The return pole 306 has a cross section at the air bearing surface (ABS) that is much greater than the cross section of the write pole 304 at the ABS. The write pole 304 and return pole 306 are connected with one another in a region removed from the ABS by a magnetic back gap layer 310, and by a magnetic shaping layer 312 that connects the back gap 310 with the write pole 304 and channels magnetic flux to the smaller write pole 304. The return pole 306, back gap 310 and shaping layer 312 can each be constructed of a magnetic material such as CoFe. The write pole 304 can be a lamination of magnetic layers such as CoFe separated by thin layers of non-magnetic material. This laminated write pole structure is made possible by a process described below, and is helpful in reducing eddy currents in the write pole and increasing magnetic switching within the write pole 304.

A non-magnetic, electrically conductive write coil 314, shown in cross section in FIG. 3, passes between the write pole 304 and the return pole 306, and preferably also passes above the write pole 304. The write coil can be embedded in a non-magnetic, electrically insulating layer 316 such as one or more layers of alumina and or hard baked photoresist.

When a current flows through the write coil 314, the resulting magnetic field causes a magnetic flux to flow through the return pole 306, back gap layer 310 shaping layer 312 and write pole 304. That results in a magnetic write field being emitted from the tip of the write pole 304 at the ABS. Because the write pole 304 has a small cross section at the ABS, the write field is dense and strong and can write a magnetic bit to a magnetic medium passing by the ABS of the write head 302. This magnetic write field passes through the magnetic medium before returning to the return pole 306. Because the return pole 306 has a much larger cross section at the ABS, the magnetic field returning to the return pole 306 is sufficiently spread out and weak that it does not erase the previously recorded bit.

In order to increase the field gradient of the magnetic field emitted from the write pole, and thereby increase the write speed, a magnetic trailing shield 318 is formed adjacent to the trailing edge of the write pole 304. The trailing magnetic shield 318 can be magnetically connected with the rest of the magnetic structure at the back of the write head 302 by a trailing return pole structure 322. The trailing magnetic shield 318 is separated from the write pole 304 by a non-magnetic trailing gap layer 320. Further magnetic spacing between the trailing shield 318 and the write pole at a location removed from the ABS by a non-magnetic step layer 324 and a non-magnetic bump 326, the construction of which will be described in greater detail herein below. The step layer 324 can also be constructed of a magnetic material, in which case the step layer 324 serves to increase the effective thickness of the write pole 304 in a region slightly removed from the ABS in order to better channel magnetic flux to the tip of the write pole 304.

It can also be seen in FIG. 3 that the write pole 304 has as tapered trailing edge 303 as well as a tapered leading edge 305. This tapering at the pole tip region of the write pole 304 improves magnetic performance by channeling magnetic flux to the write pole tip. This maximizes write field density, avoids saturation of the pole tip of the write pole 304 and maximizes write field strength.

Figure 4:
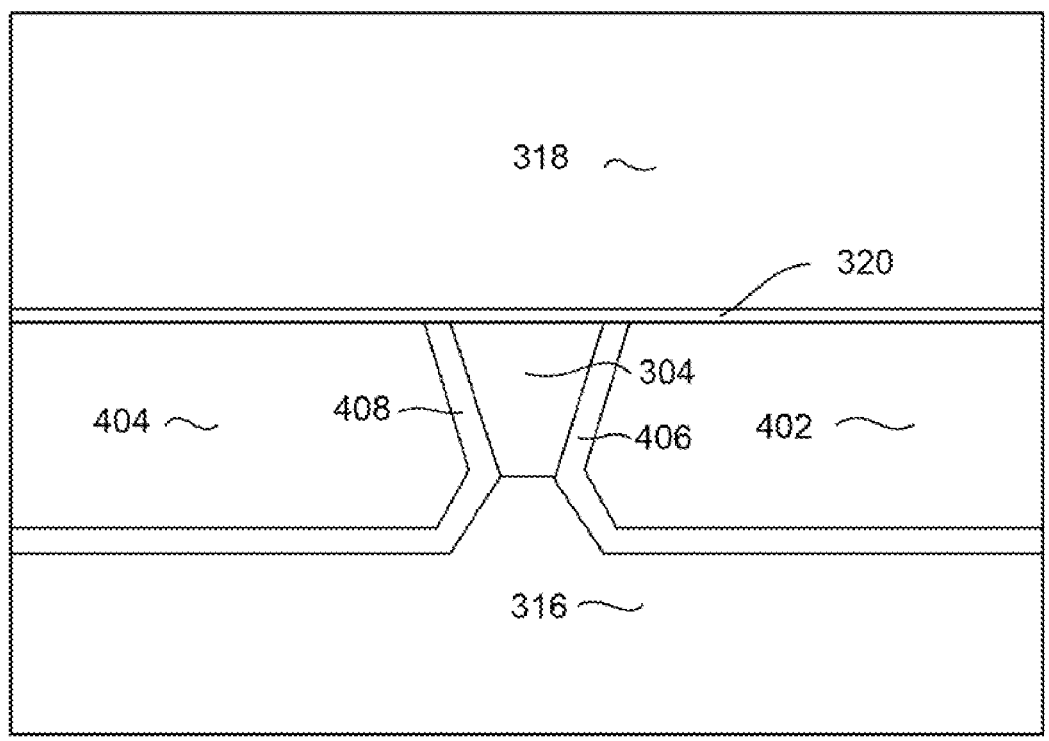
FIG. 4, is an ABS view of a portion of the write head of FIG. 3, shown enlarged as seen from line 4-4 of FIG. 3.

FIG. 4 shows an enlarged ABS view of a portion of the write head 302 as seen from line 4-4 of FIG. 3. As can be seen, the write pole 304 has tapered sides the form it with a trapezoidal shape. The trailing shield 318 can be seen formed adjacent to the trailing edge of the writ pole 304 and separated from the write pole 304 by the non-magnetic trailing gap layer 320. In addition to the trailing shield 318, the write head 302 also has first and second magnetic side shields 402, 404, that are each separated from the write pole 304 by first and second non-magnetic side gap layers 406, 408. The thickness of the side gaps 406, 408 can be different than the thickness of the trailing gap 320, and is preferably thicker than the trailing gap 320. Because the side shields 402, 404 are formed as separate structures from the trailing gap 318, they can be formed to have a different depth (as measured from the ABS) than the trailing shield 318. This also means that the side shields 402, 404 can be constructed of a different magnetic material than the trailing shield. For example, the side shields 402, 404 preferably are constructed of a material having a lower magnetic moment, while the trailing shield 318 is preferably constructed of a material having a higher magnetic moment.

Figure 5:
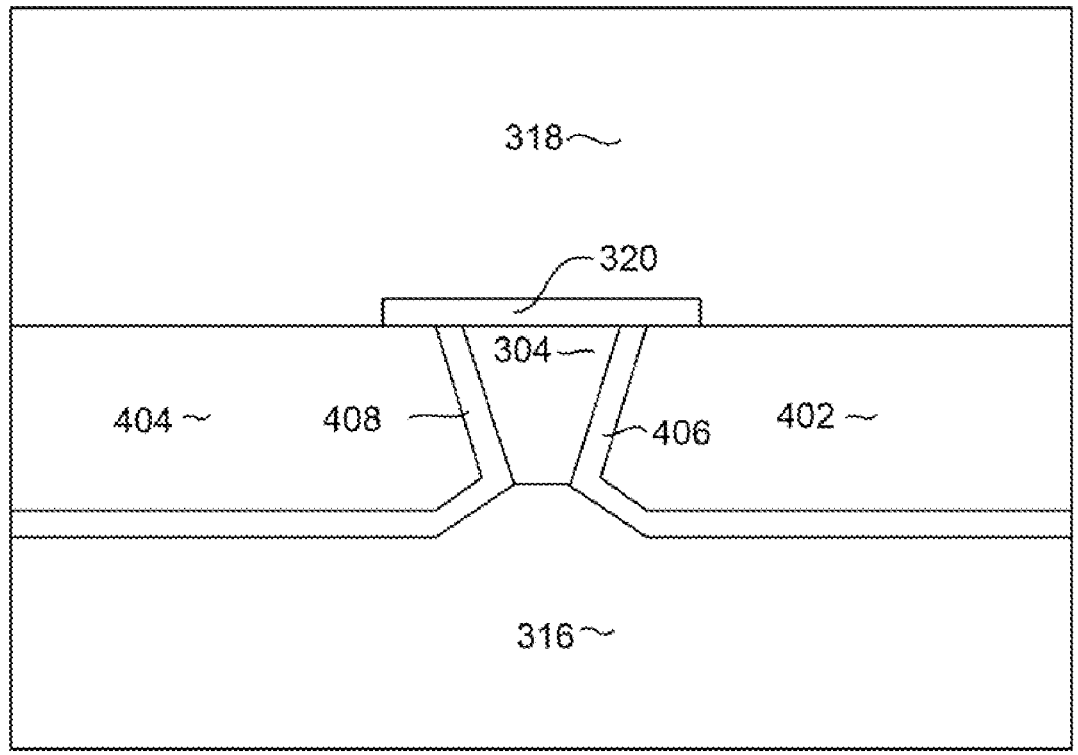
FIG. 5, is an ABS view illustrating an alternate embodiment of the invention.

While FIG. 4, shows the trailing magnetic shield 318 as being completely separated from the magnetic side shields 402, 404, the trailing shield can be magnetically connected with the side shields 402, 404. As shown in FIG. 5, the trailing gap layer 320 can be removed in the side portions to allow the trailing shield 318 to contact the side shields 402, 404. Possible methods for constructing the embodiments described with reference to FIGS. 4 and 5 will be described in greater detail herein below.

FIGS. 6-31 described a method for constructing a magnetic write head according to an embodiment of the invention. This method allows the described structure to be formed using a dry pole forming method wherein the magnetic write pole 304 material is deposited full film or electrically plated magnetic materials and later removed by a process such as ion milling. This, therefore, allows the write pole to be formed as a laminate structure for improved magnetic performance white still forming the desired write pole taper, non-magnetic step structure 324 and non-magnetic bump 326 (all described above with reference to FIG. 3) which are needed to maintain proper trailing shield spacing and for efficiently channeling magnetic flux to the tip of the write pole 304.

Figure 6:
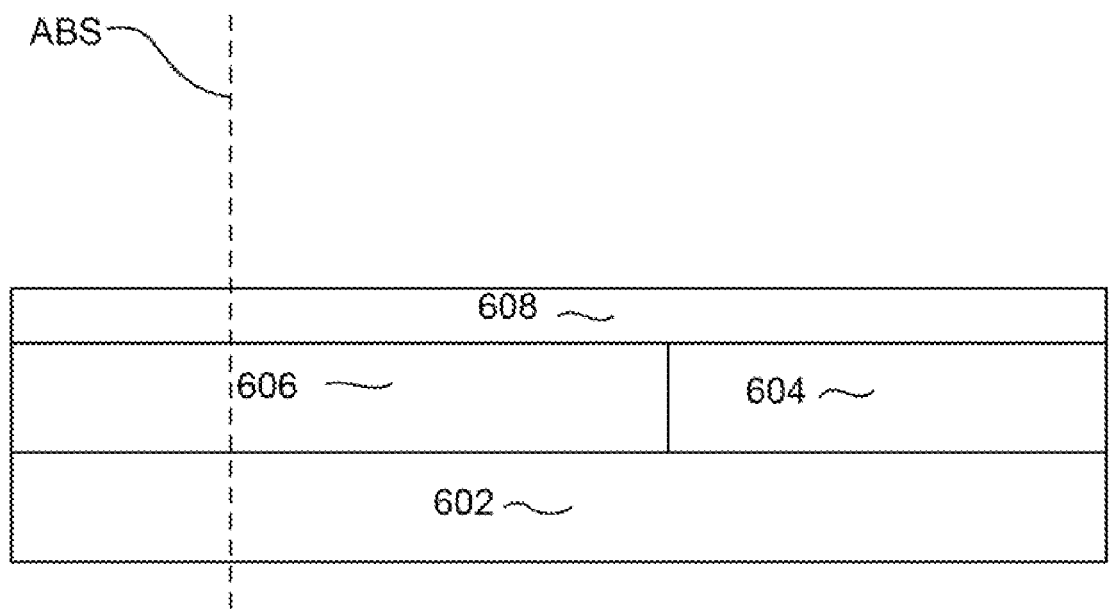
FIGS. 6-31 are views of a write head in various intermediate stages of manufacture, illustrating a method for manufacturing, a write head according to an embodiment of the invention.

With reference then to FIG. 6, a substrate 602 is provided. This substrate 602 corresponds to the fill layer 312 of FIG. 3. A series of masking and plating and deposition steps are performed to form a magnetic layer 604 and as non-magnetic layer 606 over the substrate. The magnetic layer 604 corresponds to the shaping layer 312 of FIG. 3, and can be constructed of, for example, CoFe and deposited by electroplating. The non-magnetic fill layer 606 can be constructed of alumina ($Al_2O_3$) and can be deposited by sputter deposition, atomic layer deposition or some other suitable method. A chemical mechanical polishing process (CMP) can be performed to form a planar surface across the tops of the layers 606, 604, the surfaces of the layers 604, 606 being co-planar with one another. Then, a layer of non-magnetic material 608 is deposited over the surfaces of the layers 606, 604. This non-magnetic layer is preferably deposited to a thickness 50-150 mm and can be constructed of a material such as Cr, NiCr, Ru, $Al_2O_3$, etc.

Figure 7:
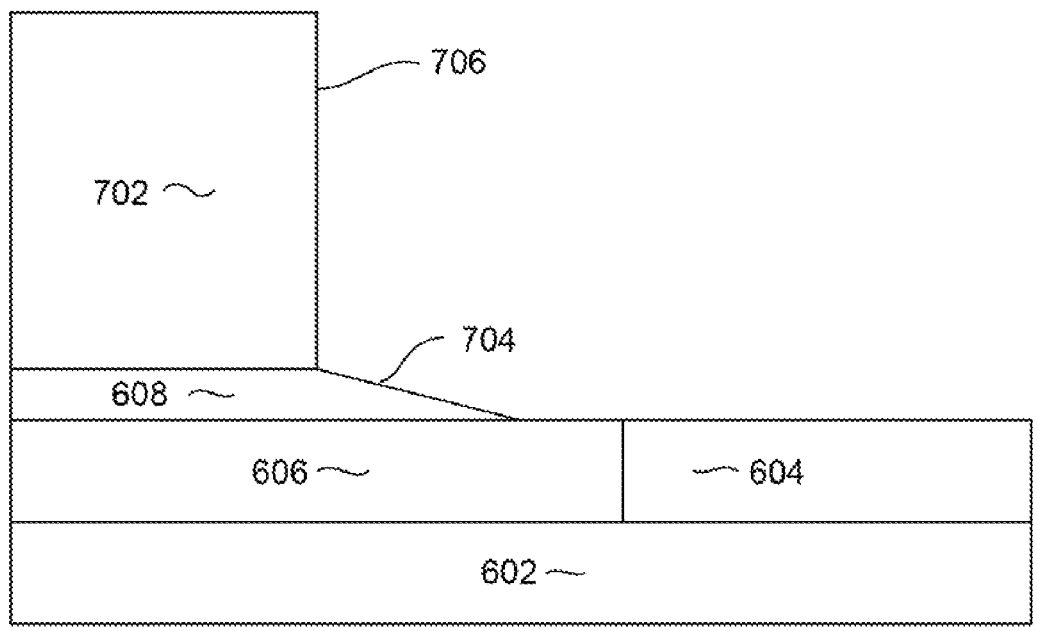
Figure 8:
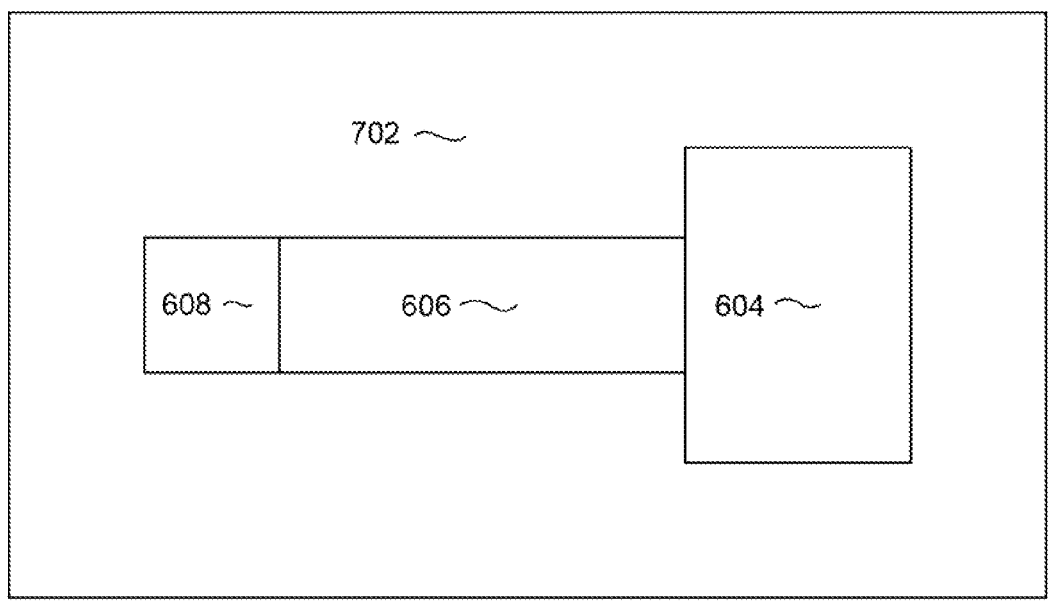

Then, with reference to FIG. 7, a mask structure 702 is formed over a portion of the non-magnetic layer 608, in a region over the fill layer 606. The mask structure 702 can be a photoresist mask and can include other layers as well such as a hard mask layer (not shown). Then, an ion milling is performed to remove a portion of the non-magnetic layer 608 that is not protected by the mask 702. The ion milling is preferably performed at an angle relative to normal so that shadowing from the mask forms the non-magnetic layer with a tapered surface 704. The tapered surface 704 preferably forms an angle of 20 to 40 degrees with respect to the surface of the layers, such as with the surface of the layers 606, 604. As can be seen, the mask 702 has a back edge 706 that defines the front end of the tapered portion 704 of the non-magnetic layer. FIG. 8 shows a top down view of the structure of FIG. 7 and shows how the masking and milling leaves a portion of the layer 608 and 604 exposed through an opening in the mask 702.

Figure 9:
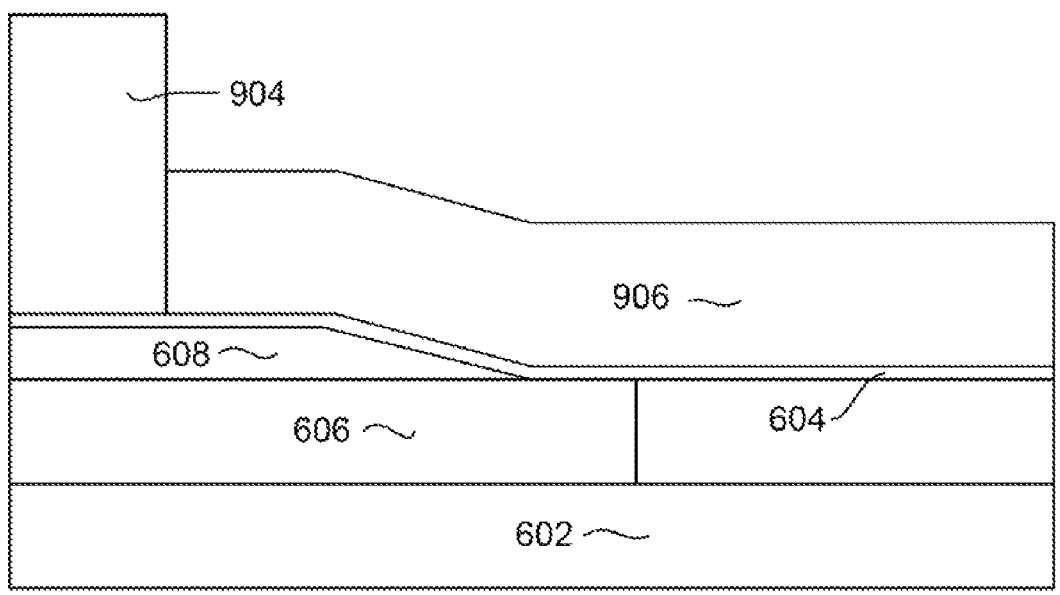

With reference now to FIG. 9, (which shows a side cross sectional view similar to FIG. 7) an electrically conductive seed layer 902 is deposited over the layers 608, 606 and 604. The seed layer can be constructed of a material such as NiCr, Ru, Ta, NiFe, CoFe, CoNiFe, Ir, Rh or a combination of these materials, and can be deposited by sputter deposition. Then, a mask 904 is formed over the seed layer 902. The mask 904 can be constructed of photolithographically patterned photoresist and has an opening that is configured to define a desired magnetic structure. A high moment magnetic material 906 such as CoFe is deposited into the opening in the mask. The magnetic material 906 can be deposited by electroplating, using the seed layer 902 as an electroplating seed. The magnetic layer 906 can also be constructed by sputter deposition.

Figure 10:
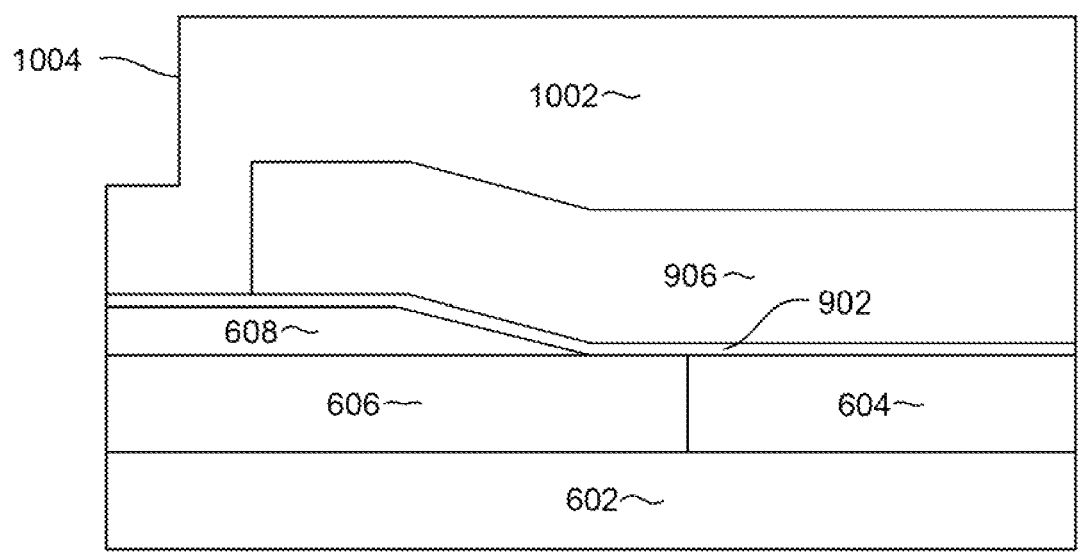

Then, the electroplating frame mask 904 is stripped away and a layer of hard, non-magnetic material 1002 is deposited, leaving a structure as shown in FIG. 10. The layer 1002 is preferably alumina and is preferably deposited to a thickness of 100 to 500 nm. As can be seen, the alumina layer 1002 rises up over the magnetic structure 906 to form a bump 1004 over the magnetic structure 902.

Figure 11:
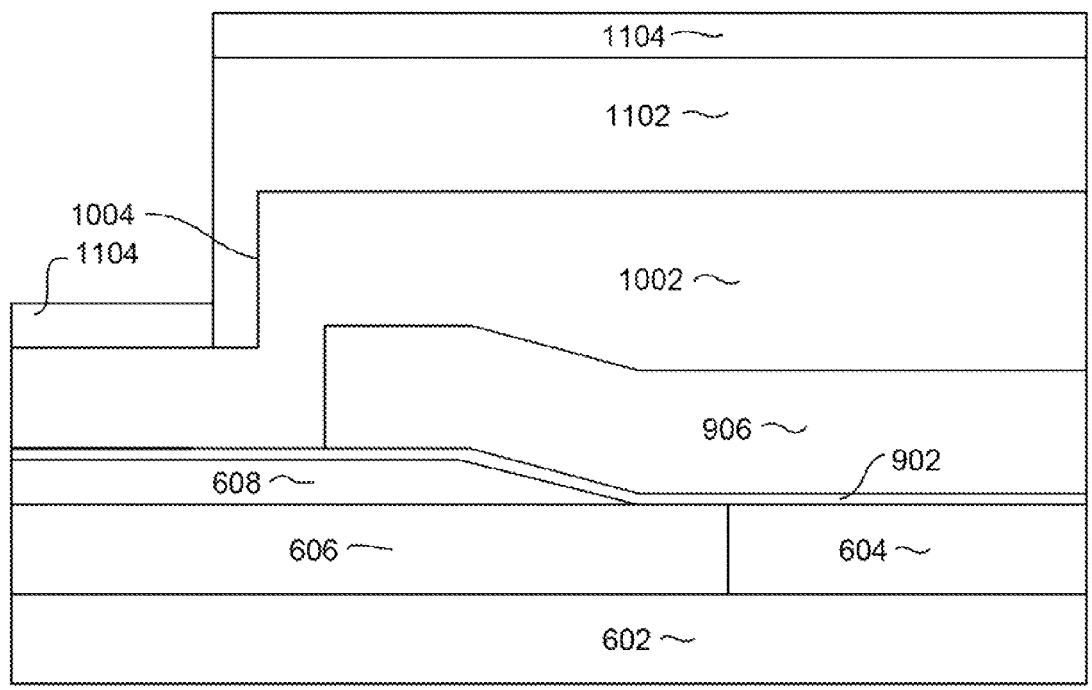
Figure 12:
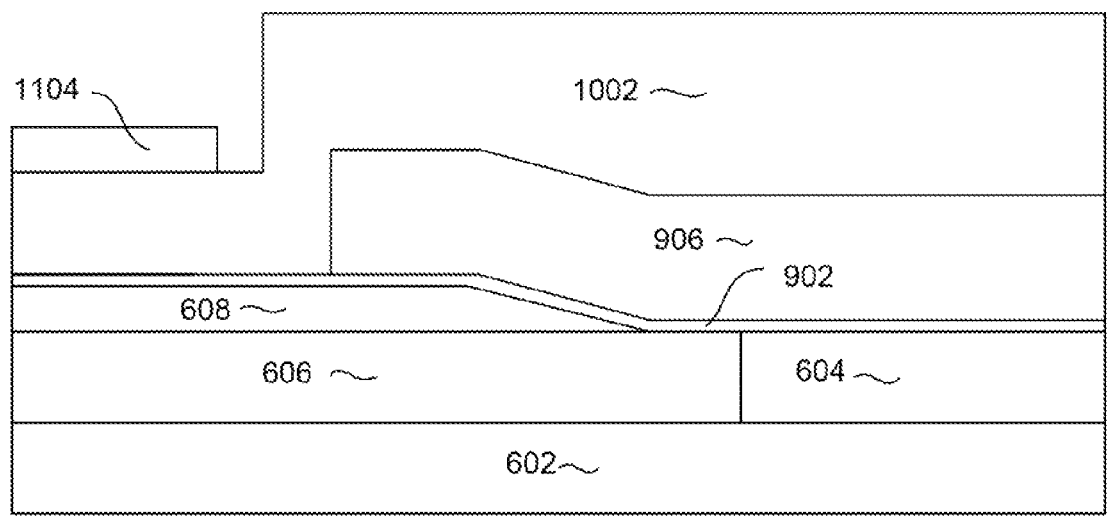
Figure 13:
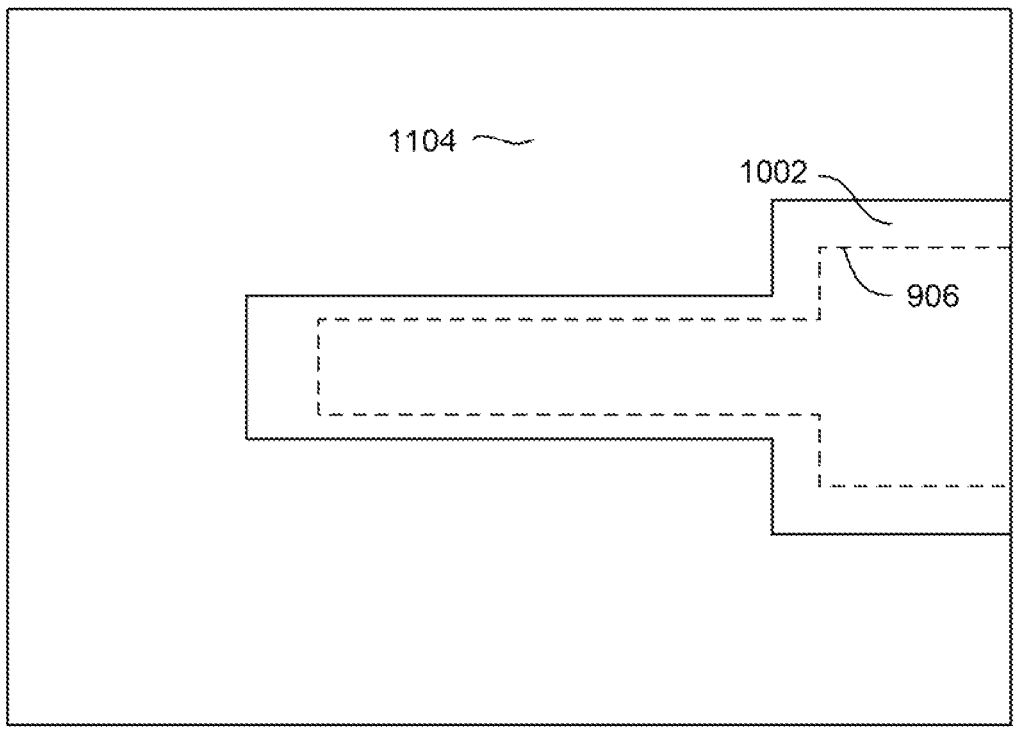

Then, with reference to FIG. 11, a mask 1102 is formed to cover an area over the magnetic structure 906 and over the raised bump 1004 of the alumina layer 1002. A layer of material that is resistant to chemical mechanical polishing (CMP stop layer) 1104 is then deposited. This CMP stop material can be a material such as Diamond Like Carbon (DLC), Ru, Ir, Rh or $SiO_2$. The mask 1102 can then be lifted off, removing with it the layer 1104 deposited over the mask 1102. This leaves a structure as shown in FIG. 12. FIG. 13 shows a top down view of the structure of FIG. 12, and shows that the CMP stop layer 1104 surrounds the region containing the magnetic structure 906. In FIG. 13, the location of the magnetic structure 906 is shown in dashed line to indicate that it is actually hidden beneath the alumina layer 1002.

Figure 14:
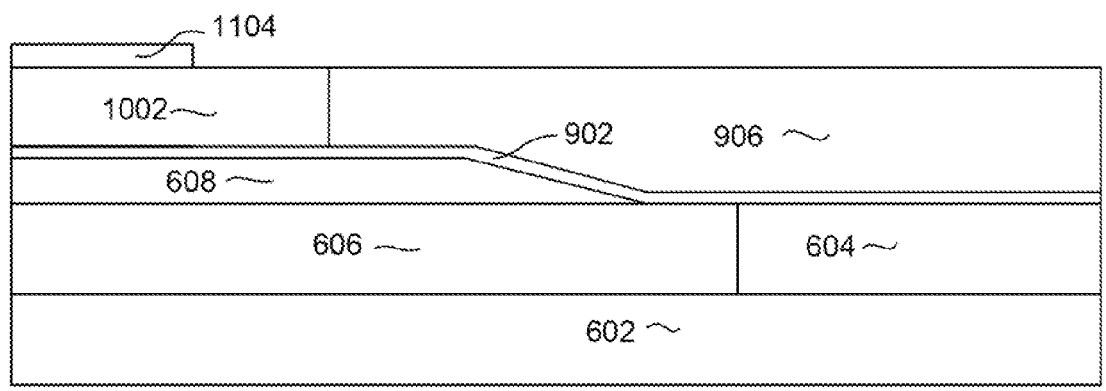
Figure 15:
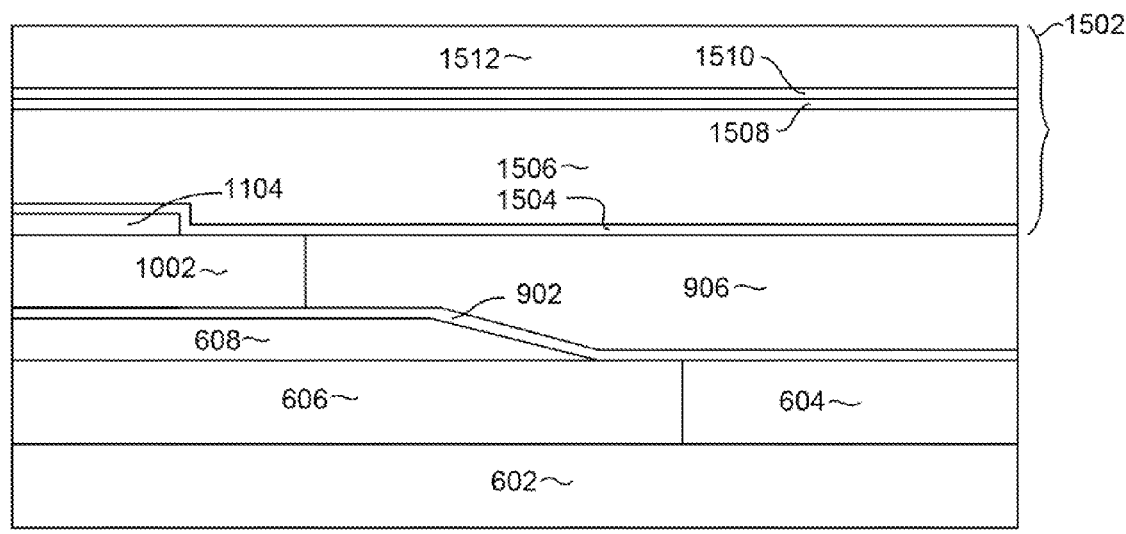

A chemical mechanical polishing can then be performed to remove the bump 1004 of material 1102, leaving a structure such as that shown in FIG. 14. This filling and chemical mechanical polishing process is an important advantage of the present method, in that it allows a write pole material to be either formed by electrical plating or by a deposition method such as sputter deposition, while still being formed by a dry pole process. With reference now to FIG. 15, a mask structure 1502 is formed over the magnetic material 906, fill layer 1002 and hard mask 1104. The mask material 1502 can include several layers such: as a thin hard mask layer 1504 such as Al$_2$O$_3$; an image transfer layer 1506, which can be a soluble polyimide material such as DURAMIDE®; a second hard mask layer 1508, which can be constructed of a material such as SiO$_2$; a Bottom Antireflective Coating (BARC) 1510; and a patterned photoresist layer 1512. The shape of the mask 1502 can be seen more clearly with reference to FIG. 16, which shows a top down view of the structure of FIG. 15. The mask is formed with openings 1602 that are configured to define a desired write pole shape, in that portions where write pole are to be formed are left covered in the center of the mask structure 1502 and areas adjacent to the write pole are left exposed by the openings 1602.

Figure 16:
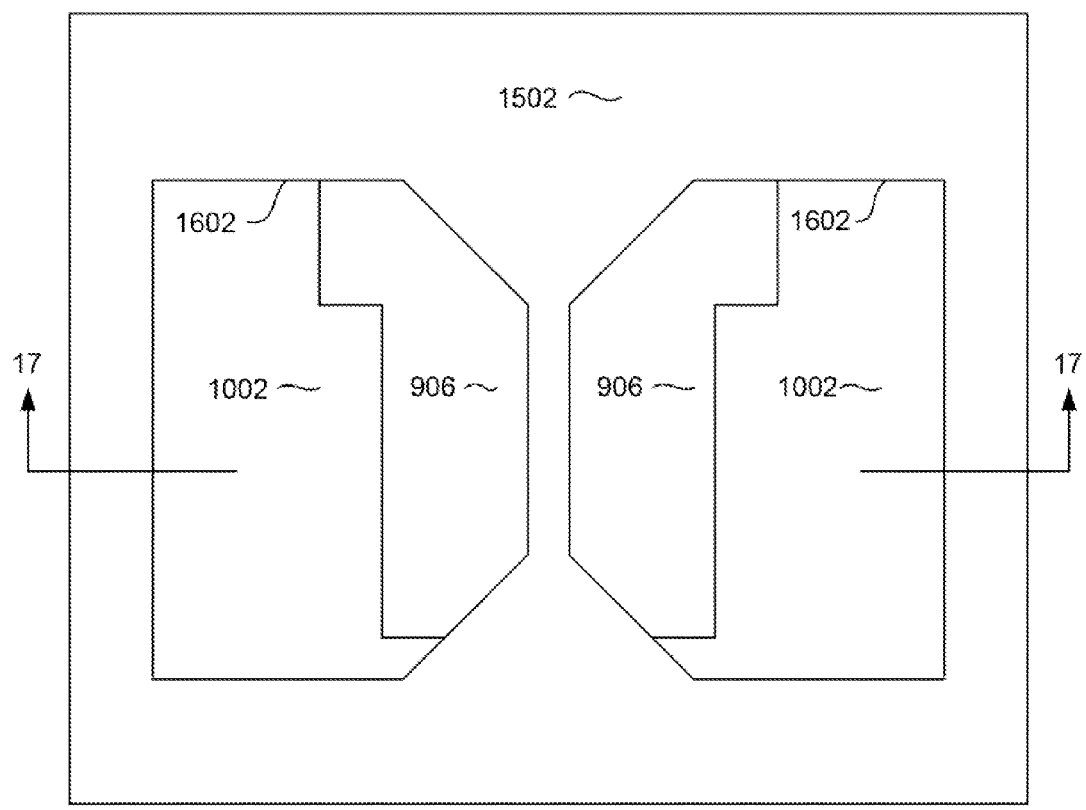
Figure 17:
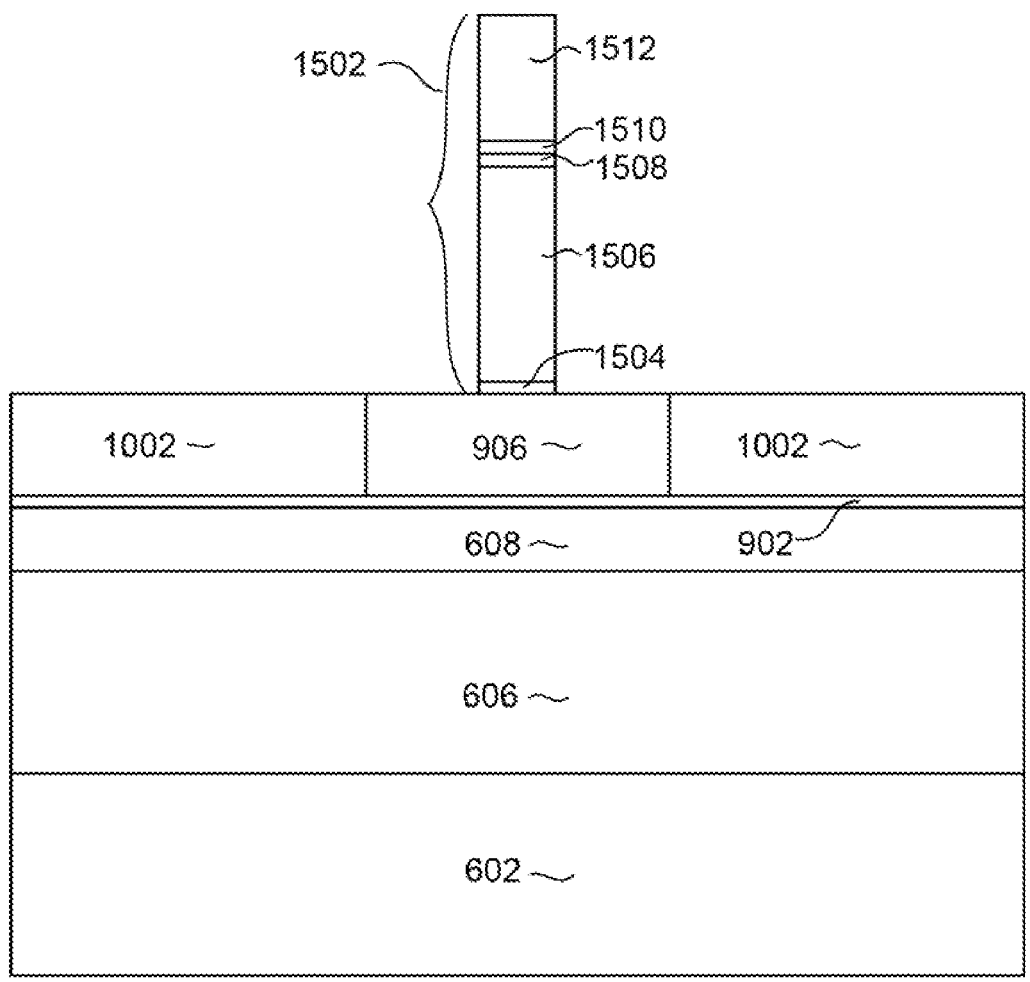
Figure 18:
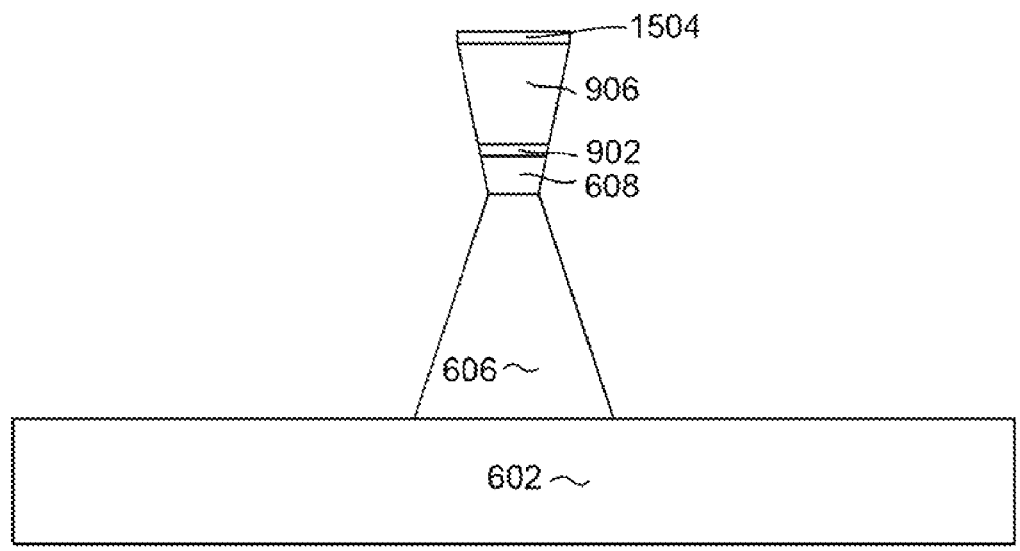

FIG. 17 is a cross sectional view taken along a plane parallel with the ABS, along the line 17-17 of FIG. 16. The mask 1502 has a width that is configured to define a track width of a write pole, as will be seen. The mask portion 1502 shown in FIG. 17 corresponds with the center portion of the mask 1502 as shown in FIG. 16. An ion milling is then performed to remove material that is not protected, by the mask 1502, leaving a structure such as that shown in FIG. 18. The ion milling is preferably performed at one or more angles relative to normal in order to form the magnetic layer 906 into a write pole 906 having tapered sides and a trapezoidal shape, as desired. The ion milling is also performed sufficiently to remove a significant portion of the non-magnetic layer 608 underlying the magnetic layer 906 to form as bottom portion for the write pole 906 After the ion milling, the hard mask 1504 remains, with the rest of the mask structure 1502 (FIG. 17) being consumed by the ion milling and wet stripping process.

Figure 19:
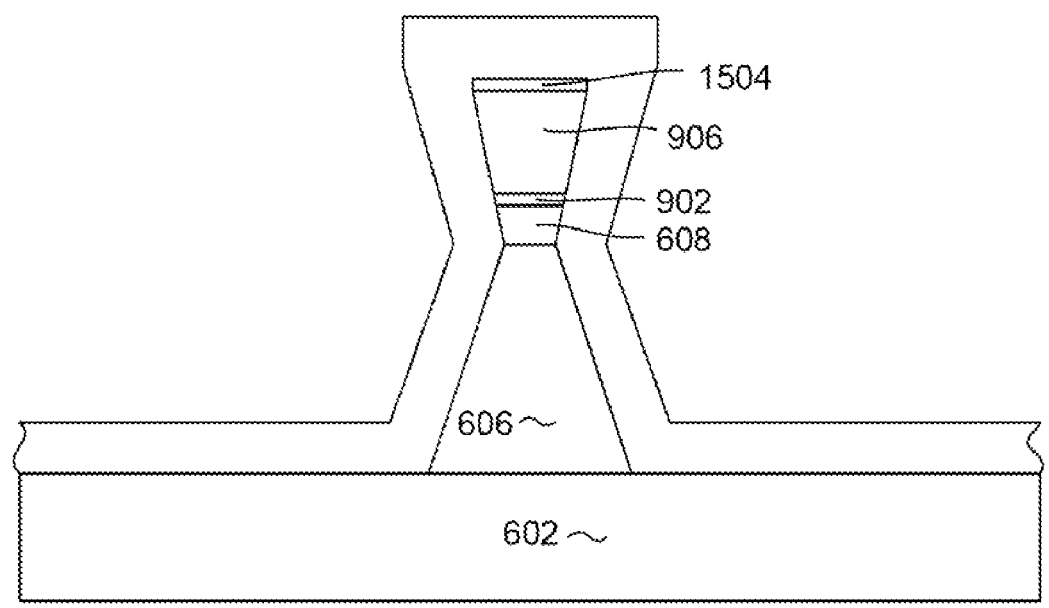

Then, with reference to FIG. 19, a layer of non-magnetic material 1902 is deposited by a conformal deposition process cover the sides of the write pole 906 as well as extending over the top of the write pole 906 and substrate 600. The non-magnetic metal can be Ru or can be a combination of Ru and alumina (Al$_2$O$_3$), and the total thickness of the non-magnetic layer 1902 is preferably 30 to 150 nm.

Figure 20:
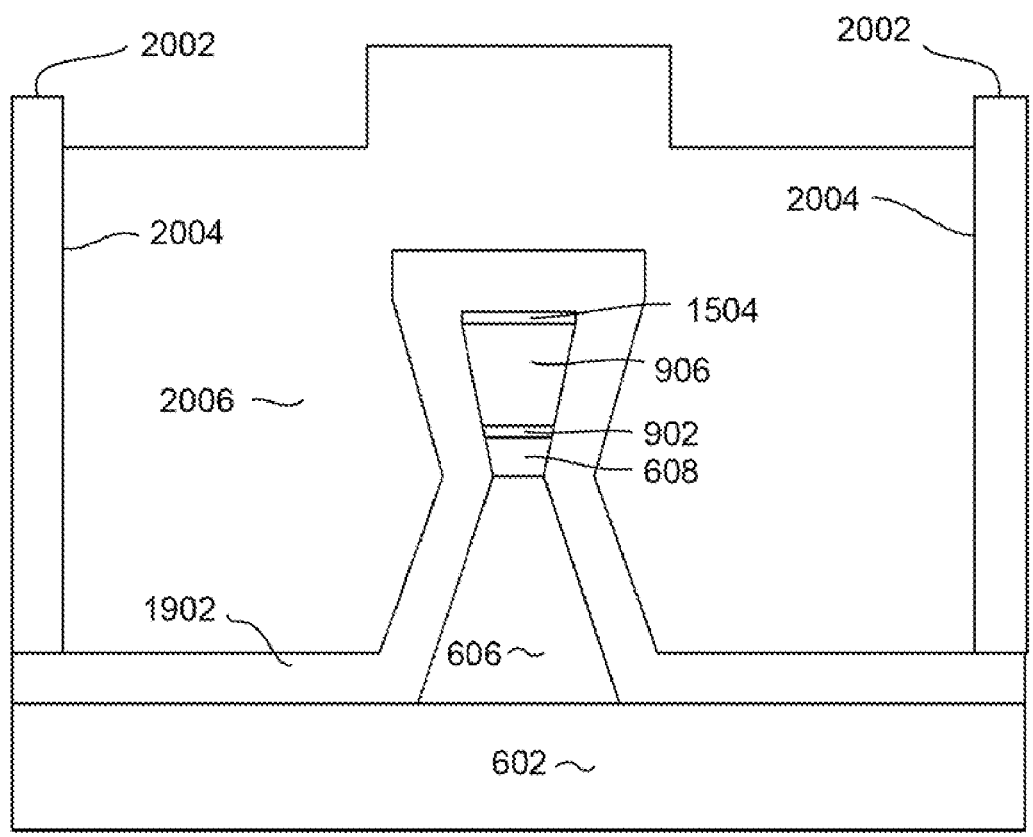
Figure 21:
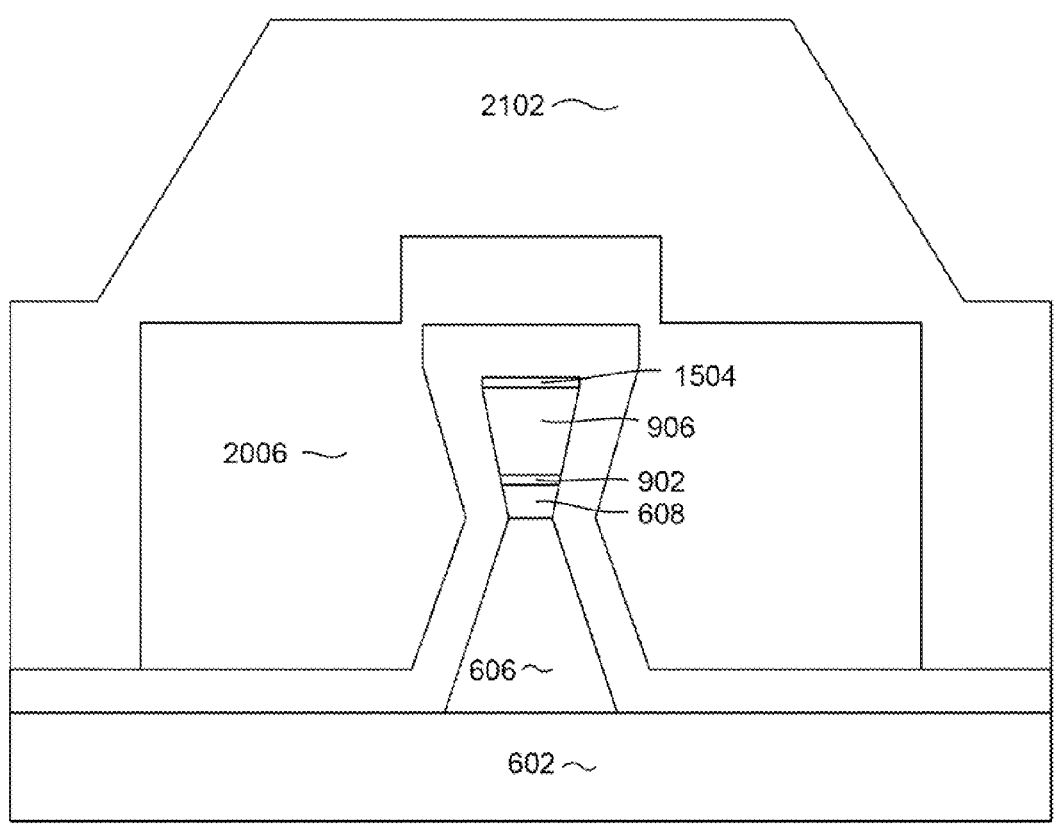

With reference to FIG. 20, a photoresist mask structure 2002 is formed having an opening 2004 that is configured to define the shape of a desired magnetic side shield. Then, a magnetic material 2006 is deposited into the opening 2004 to form a magnetic side shield. This magnetic material 2006 is preferably a relatively low magnetic moment material such as NiFe.

Figure 22:
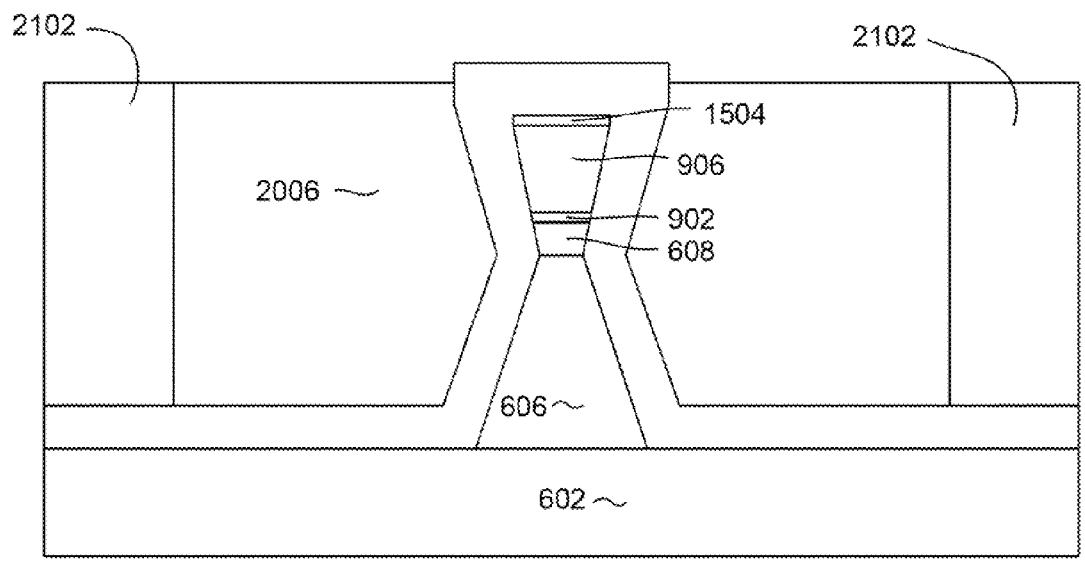

The photoresist mask 2002 is then removed and a layer of alumina fill material 2102 is deposited. The fill alumina fill layer 2102 is deposited full film, and forms a bump 2104 where it extends over the write pole 906 and shield 2006. A chemical mechanical polishing process is then performed to remove the bump 2104, leaving a structure as shown in FIG. 22, with the top of the non-magnetic layer 1902 exposed over the write pole 906. An ion milling is then performed to remove the exposed portion of the non-magnetic layer 1902 and also to remove the hard mask layer 1504 from over the write pole, leaving a structure as shown in FIG. 23.

Figure 23:
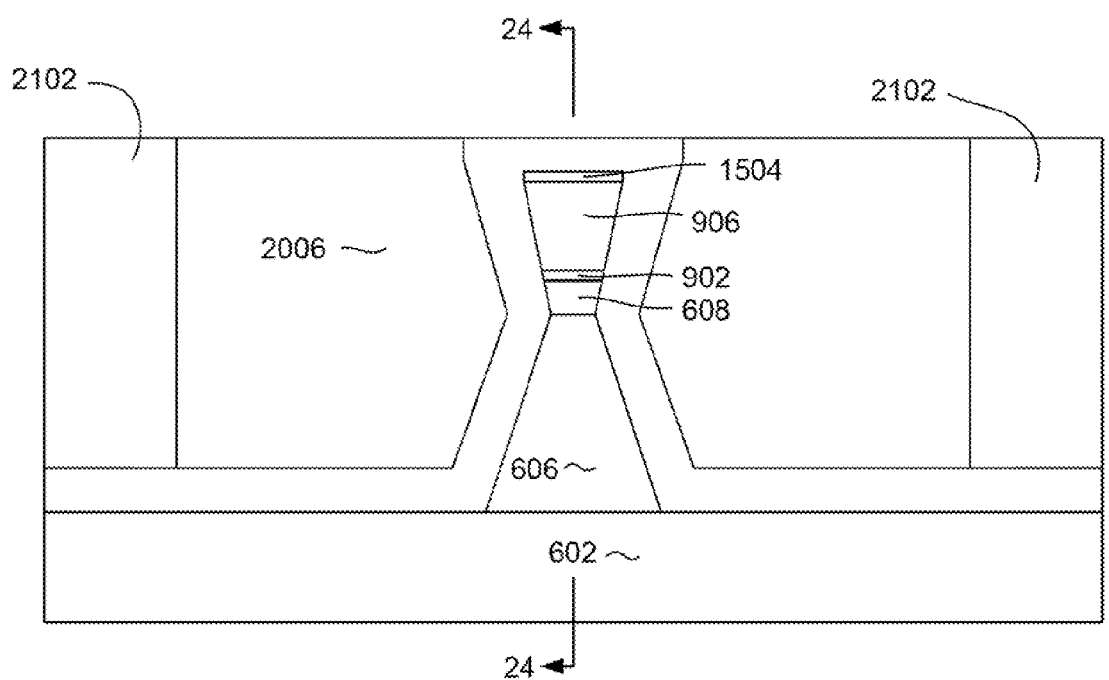
Figure 24:
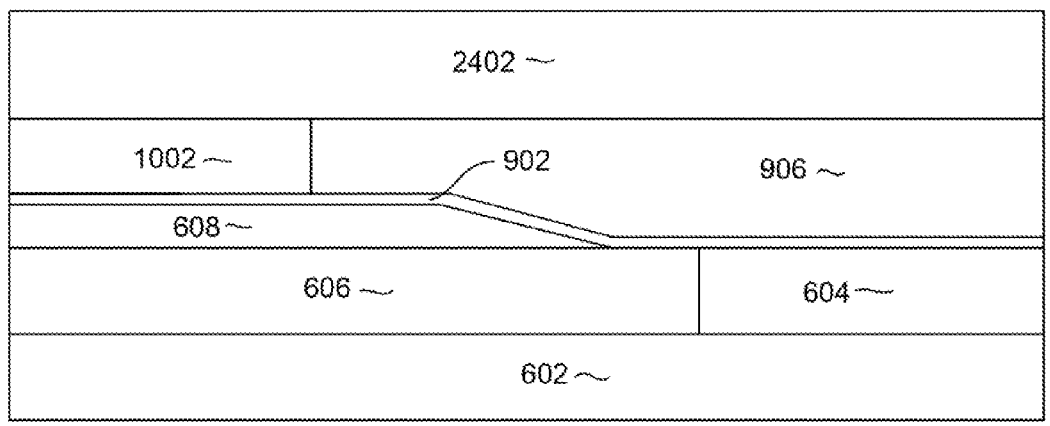

With reference to FIG. 24, which shows a side cross sectional view as seen from line 24-24 of FIG. 23, a layer of step material 2402 is deposited over the write pole 906 and fill layer 1002. This is preferably deposited to a thickness of 50 to 150 nm. If a design goal is to increase the magnetic spacing between the trailing shield and the write pole, then the step material layer 2402 can be a non-magnetic material such as Ru, Ir, Rh, NiCr, etc. If on the other hand, a design goal is to increase the effective thickness of the write pole in a region slightly removed from the ABS, then the step layer 2402 can be a magnetic material such as CoFe, CoFeNi, or FeNi.

Figure 25:
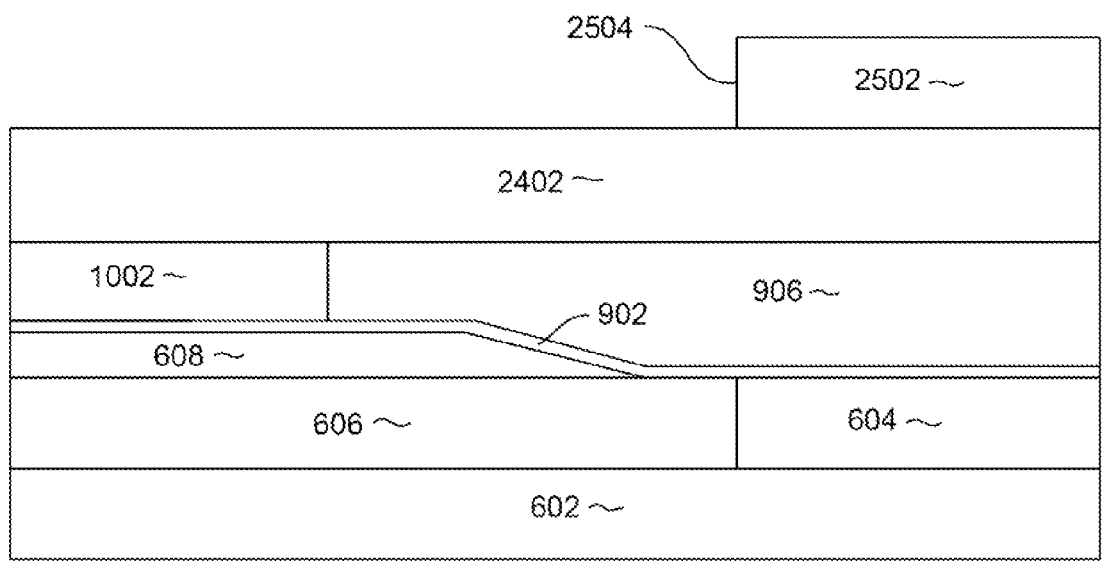
Figure 26:
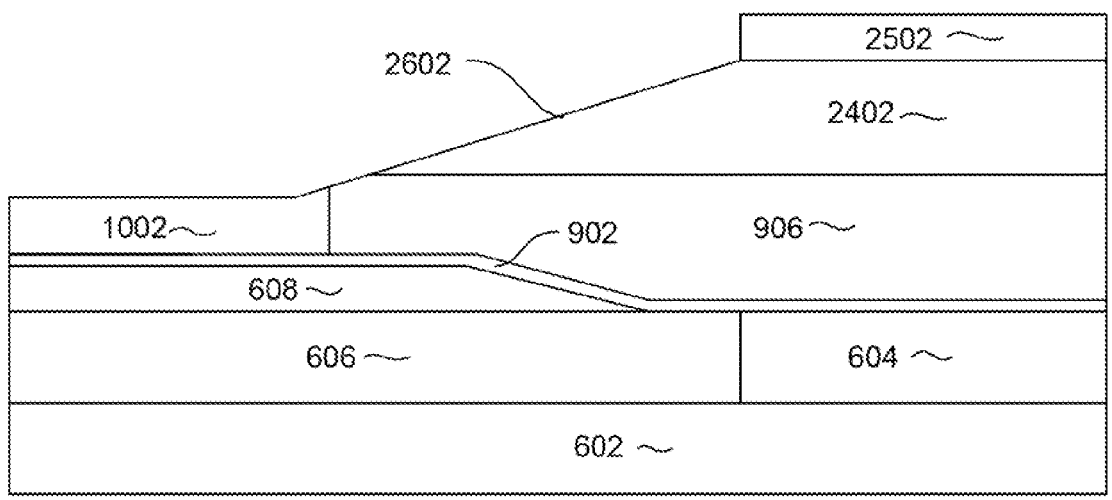

Then, with reference to FIG. 25, a mask structure 2502 is formed over the step layer 2402. The mask 2502 has a front edge 2504 that is located so as to define a back edge of a tapered portion of the step layer 2402 as will be seen. An ion milling is performed to remove a portion of layers 2402, 1002 and 906 forming a tapered edge 2602 as shown in FIG. 26. The ion milling is preferably performed at an angle relative to normal in order to form the taper 2602 with a desired taper angle of preferably 20 to 40 degrees relative to the horizontal plane (i.e. plane of the deposited layers).

Figure 27:
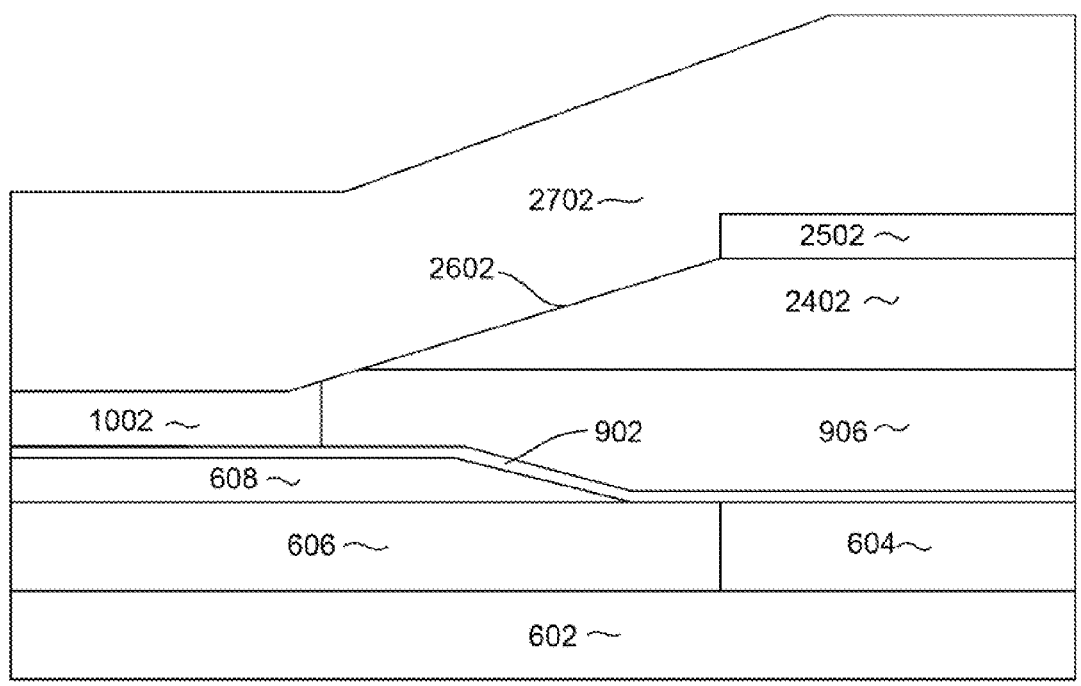
Figure 28:
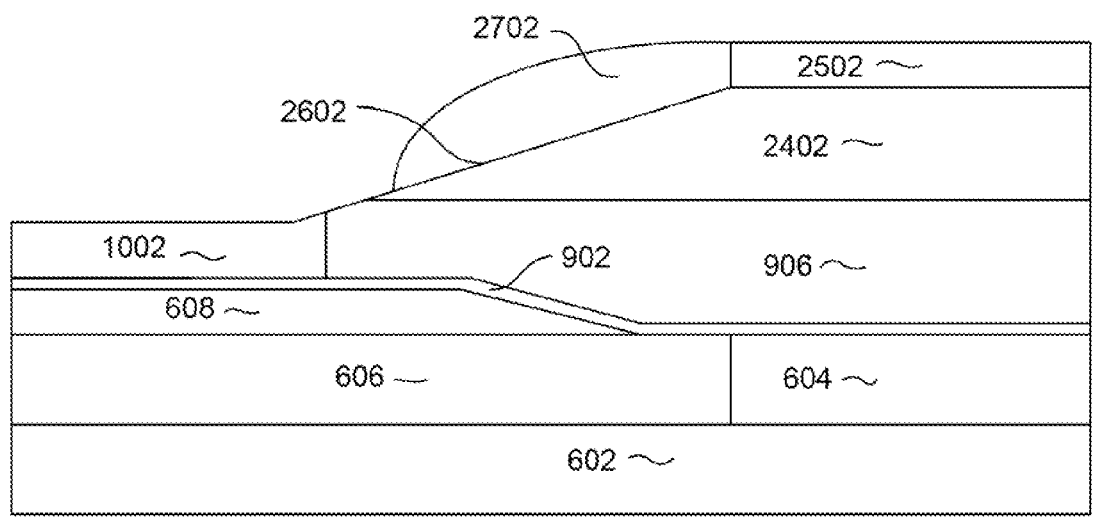

Then, a layer of non-magnetic bump material 2702 is deposited full film as shown in FIG. 27. This material is preferably alumina (Al$_2$O$_3$), which is preferably deposited by atomic layer deposition (ALD) to a thickness of 50 to 150 nm. Then, an ion milling is performed to remove a portion of the non-magnetic bump material 2702. This ion milling is performed in such a manner and at such an angle relative to normal that shadowing from the layers 2402 and 2502 cause the remaining material 2702 to form a bump 2702 at the front edge of the mask layer 2502 and over at least a portion of the tapered surface 2602. An optional further ion milling can be performed to remove a greater portion of the magnetic layer 906 to further taper the trailing edge of the magnetic layer 906. This further tapering is performed using the bump 2702 as a mask so that the location of the additional tapering can be accurately determined and controlled.

Figure 29:
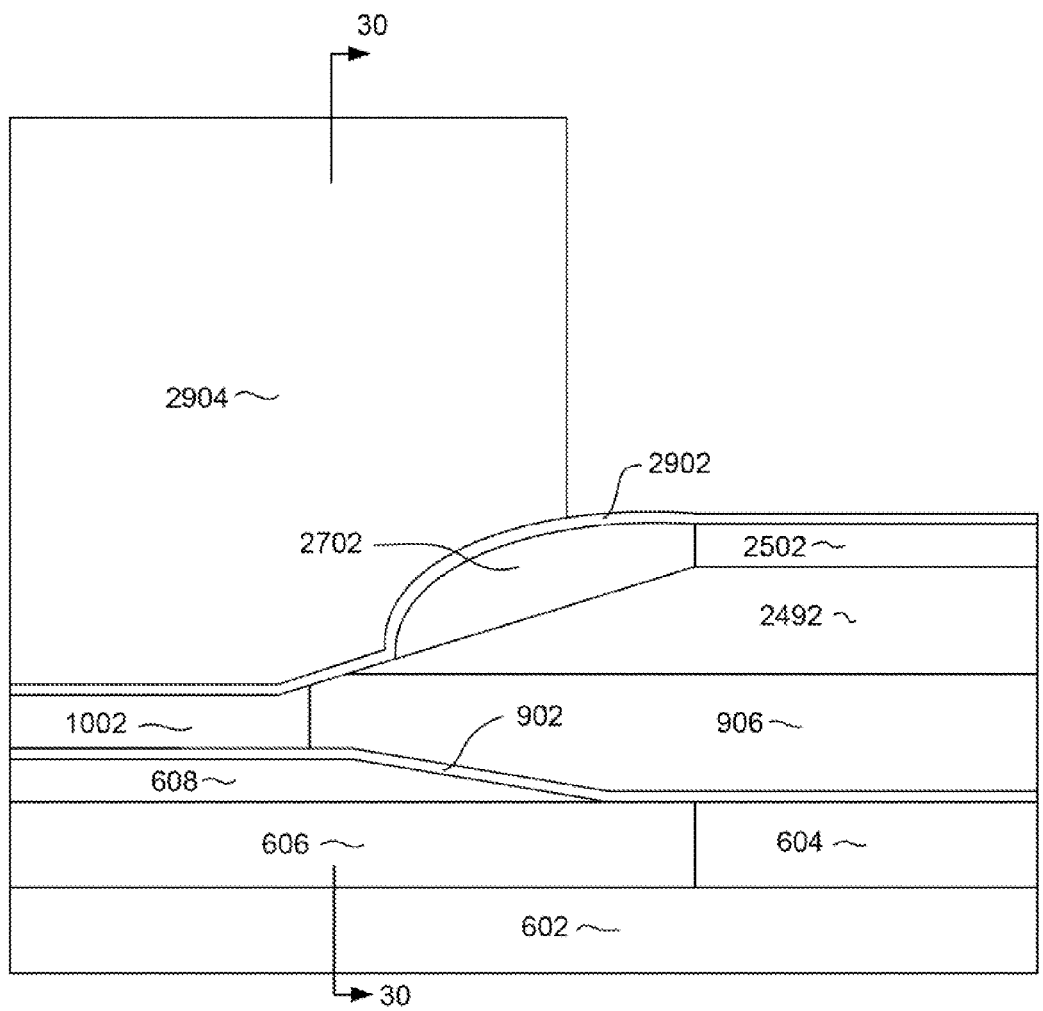

Then, with reference to FIG. 29, an electrically conductive seed layer 2902 is deposited. A magnetic shield 2904 is then formed by constructing an electroplating frame mask (not shown), and then electroplating a magnetic material into an opening in the electroplating frame mask. The mask can then be lifted off, leaving the structure as shown in FIG. 29. The seed layer 2902 is formed of a non-magnetic material such as Ru or Rh. Also, because the side shields 1006 (FIG. 23) were formed in a separate process than was used to construct the trailing shield 2904, the trailing shield 2904 can be constructed of a completely different material than that which was used to construct the side shields 1006. Preferably the trailing shield 2904 is constructed of a material having a higher magnetic moment than that used to construct the side shields 1006. With this in mind, the trailing shield can be constructed of CoFe, or CoNiFe. In addition, the trailing shield 2904 can be constructed to have a completely different throat height than that of the side shields 1006.

Figure 30:
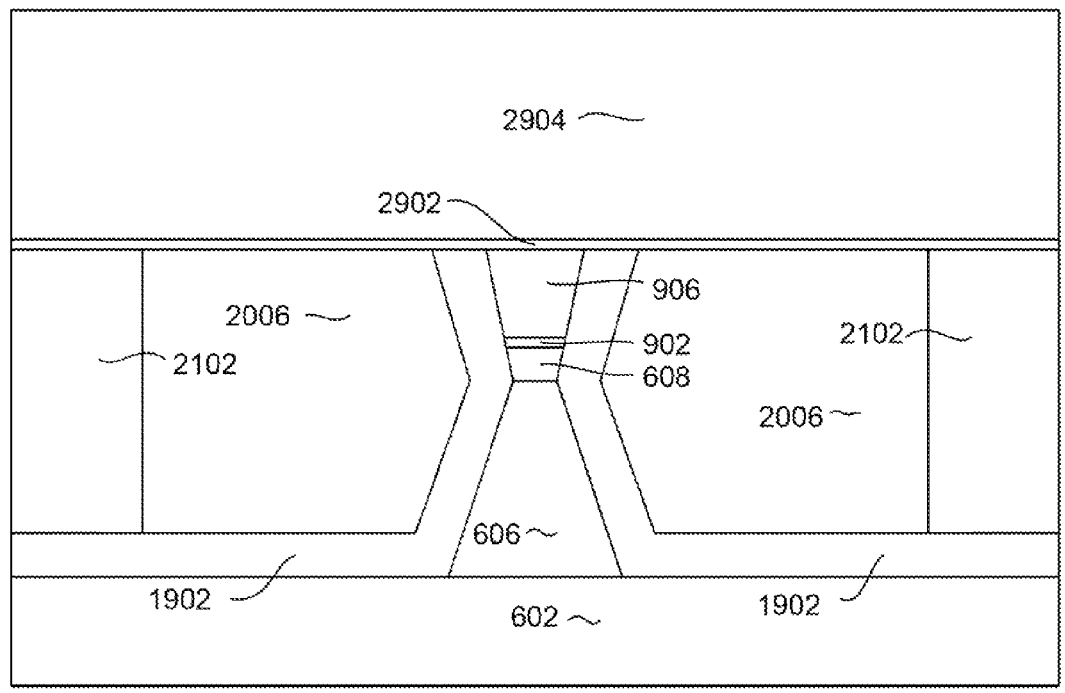
Figure 31:
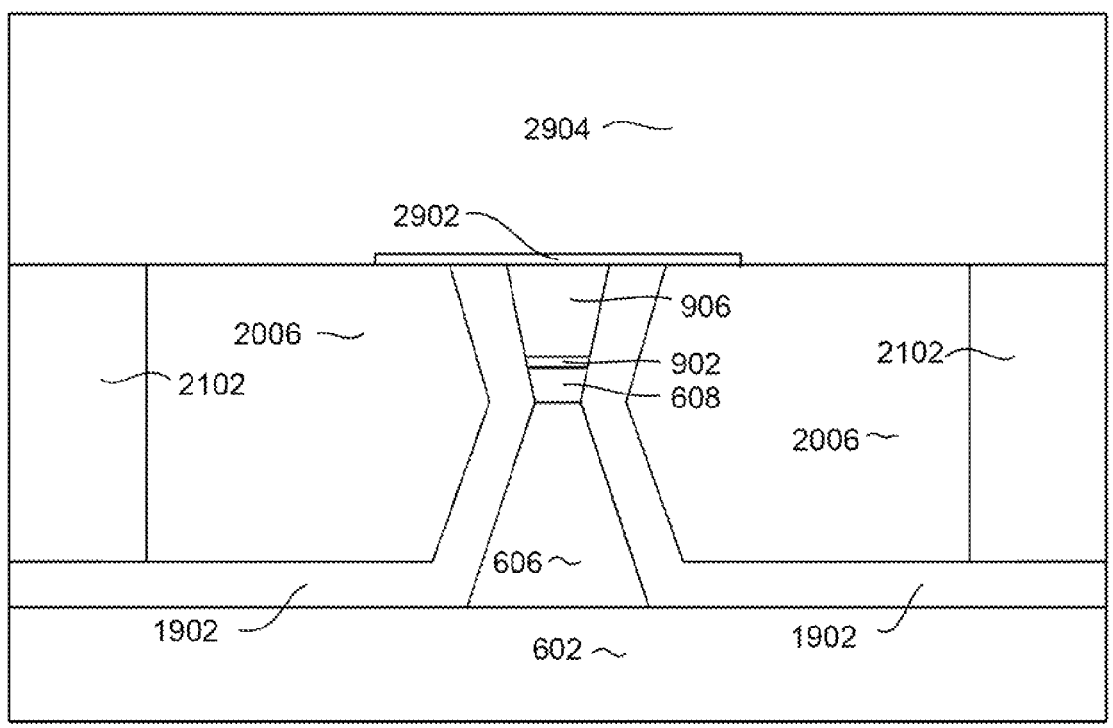

FIG. 30 shows a view of the structure of FIG. 29 as viewed along plane 30-30 of FIG. 29. As can be seen, the side shields 1006 are completely physically and magnetically disconnected with the trailing shield 2904 by the non-magnetic gap layer 2902. In another embodiment, shown in FIG. 31, the trailing shield 2904 and the side shields 1006 can be connected with each other by removing a portion of the non-magnetic gap layer 2902 in a region outside of the write pole 906 and side gap layer 1902. This can be accomplished by forming a mask over the desired remaining portion of the gap layer 2902 and performing an ion milling to remove unwanted portions of the gap layer 2902 prior to forming the shield 2904.

Figure 32:
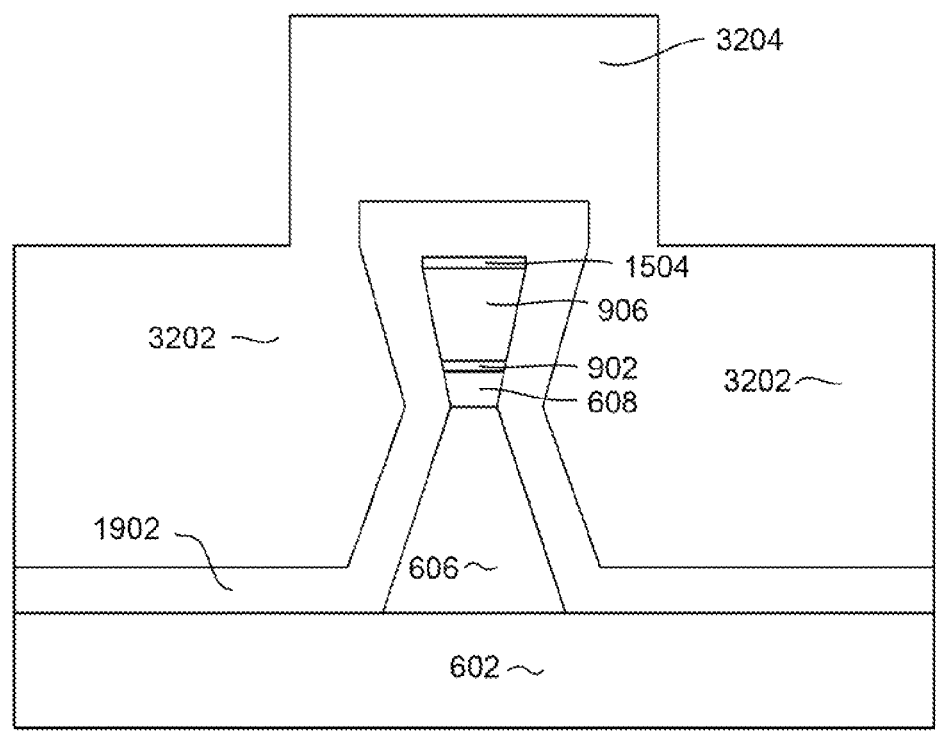
FIGS. 32-34 are views of a write head in various intermediate stages of manufacture illustrating a method for manufacturing a write head according to an alternate embodiment of the invention.
Figure 33:
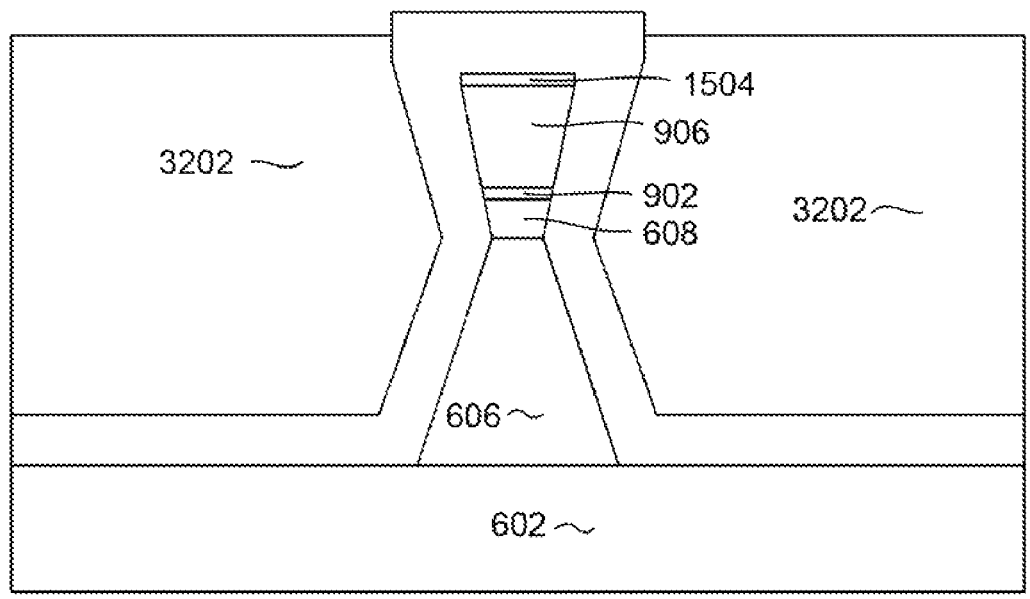
Figure 34:
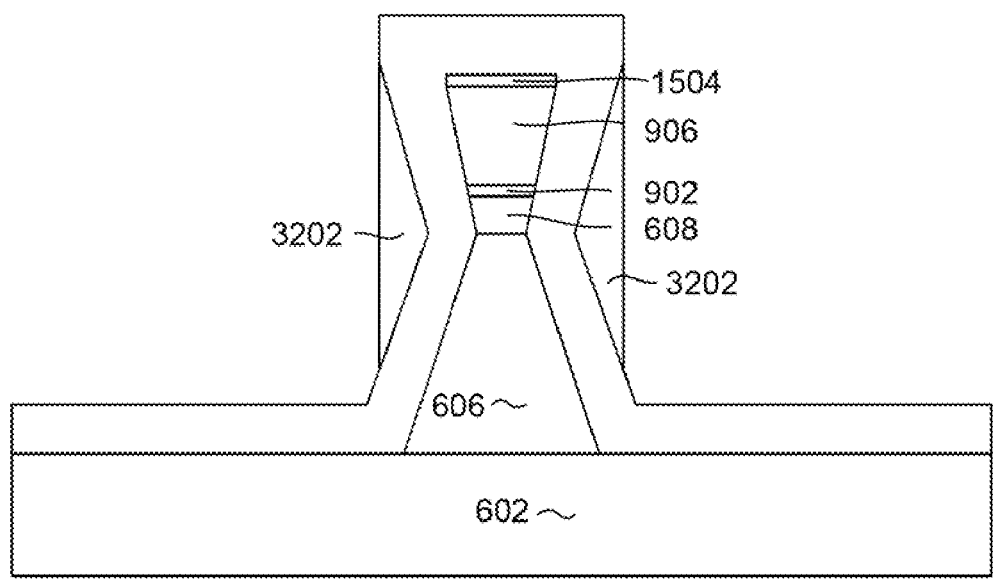

The above described process results in a write head having conformal side shields. The side gap layers 1902, and also the inner edges of the side gap layers 1006 (FIGS. 30 and 31) conform to the tapered sides of the write pole 906. FIGS. 32 through 34 illustrate an alternate method that can be used to construct a write pole having non-conformal side shields. Starting with a structure such as that shown above with reference to FIG. 19 (and formed by the same methods used to arrive at the structure described above with reference to FIG. 19), a layer of non-magnetic material such as alumina 3202 is deposited full film. This alumina layer 3202 forms a bump over the location of the write pole 902. A chemical mechanical polishing is then performed to remove the bump 3204, exposing the non-magnetic layer 1902 and leaving a structure such as that shown in FIG. 33. Then, a $BCL_3/Cl_2$ chemistry reactive ion etch process is performed to remove most of the alumina fill layer 3202, leaving side-walls 3402 with straight, vertical sides 3404.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
   depositing a magnetic write pole material;
   forming a write pole defining mask structure over the magnetic write pole material;
   performing an ion milling to remove a portion of the magnetic write pole material, thereby forming a magnetic write pole;
   depositing a non-magnetic side gap material;
   forming a side shield defining mask having an opening configured to define a side shield;
   depositing a magnetic material into the opening in the side shield defining mask to form first and second magnetic side shields;
   removing the side shield defining mask;
   depositing a non-magnetic fill layer;
   performing a chemical mechanical polishing;
   performing an ion milling to remove a portion of the non-magnetic side gap layer that extends over the write pole;
   forming a tapered trailing edge surface on the write pole;
   depositing a non-magnetic trailing gap layer; and
   forming a trailing shield over the non-magnetic trailing gap layer.

2. A method for manufacturing a magnetic write head, comprising:
   depositing a non-magnetic layer, and forming a tapered surface on the non-magnetic material
   after depositing the non-magnetic layer, and forming a tapered surface on the non-magnetic material, depositing a magnetic write pole material, at least a portion of the magnetic write pole material being deposited over the tapered surface of the non-magnetic material;
   forming a write pole defining mask structure over the magnetic write pole material;
   performing an ion milling to remove a portion of the magnetic write pole material, thereby forming a magnetic write pole;
   depositing a non-magnetic side gap material;
   forming a side shield defining mask having an opening configured to define a side shield;
   depositing a magnetic material into the opening in the side shield defining mask to form first and second magnetic side shields;
   removing the side shield defining mask;
   depositing a non-magnetic fill layer;
   performing a chemical mechanical polishing;
   performing an ion milling to remove a portion of the non-magnetic side gap layer that extends over the write pole;
   forming a tapered trailing edge surface on the write pole;
   depositing a non-magnetic trailing gap layer; and
   forming a trailing shield over the non-magnetic trailing gap layer.

3. The method as in claim 1 wherein the forming a tapered trailing edge surface on the write pole further comprises, after performing the chemical mechanical polishing:
   depositing a step layer;
   forming a taper mask over the step layer;
   performing an ion milling to remove a portion of the step layer and magnetic write pole material to form the tapered surface on the trailing edge of the magnetic write pole material.

4. A method for manufacturing a magnetic write head, comprising:
   depositing a magnetic write pole material;
   forming a write pole defining mask structure over the magnetic write pole material;
   performing an ion milling to remove a portion of the magnetic write pole material, thereby forming a magnetic write pole;
   depositing a non-magnetic side gap material;
   forming a side shield defining mask having an opening configured to define a side shield;
   depositing a magnetic material into the opening in the side shield defining mask to form first and second magnetic side shields;
   removing the side shield defining mask;
   depositing a non-magnetic fill layer;
   performing a chemical mechanical polishing;
   performing an ion milling to remove a portion of the non-magnetic side gap layer that extends over the write pole;
   forming a tapered trailing edge surface on the write pole;
   depositing a non-magnetic trailing gap layer; and
   forming a trailing shield over the non-magnetic trailing gap layer;
   wherein the forming a tapered trailing edge surface on the write pole further comprises, after performing the chemical mechanical polishing:
      depositing a step layer;
      forming a taper mask over the step layer;
      performing an ion milling to remove a portion of the step layer and magnetic write pole material to form the tapered surface on the trailing edge of the magnetic write pole material; and
   wherein the step layer comprises a magnetic material which serves as portion of the write pole.

5. A method for manufacturing a magnetic write head, comprising:
   depositing a magnetic write pole material;
   forming a write pole defining mask structure over the magnetic write pole material;
   performing an ion milling to remove a portion of the magnetic write pole material, thereby forming a magnetic write pole;
   depositing a non-magnetic side gap material;
   forming a side shield defining mask having an opening configured to define a side shield;
   depositing a magnetic material into the opening in the side shield defining mask to form first and second magnetic side shields;
   removing the side shield defining mask;
   depositing a non-magnetic fill layer;
   performing a chemical mechanical polishing;
   performing an ion milling to remove a portion of the non-magnetic side gap layer that extends over the write pole;
   forming a tapered trailing edge surface on the write pole;
   depositing a non-magnetic trailing gap layer; and forming a trailing shield over the non-magnetic trailing gap layer;

wherein the forming a tapered trailing edge surface on the mite pole further comprises, after performing the chemical mechanical polishing:
depositing a step layer;
forming a taper mask over the step layer;
performing an ion milling to remove a portion of the step layer and magnetic write pole material to form the tapered surface on the trailing edge of the magnetic write pole material; and wherein the step layer comprises a non-magnetic material and serves to increase magnetic spacing between the trailing shield and the write pole in a region removed from an air bearing surface.

6. A method for manufacturing a magnetic write head, comprising:
depositing a magnetic write pole material;
forming a write pole defining mask structure over the magnetic write pole material;
performing an ion milling to remove a portion of the magnetic write pole material, thereby forming a magnetic write pole;
depositing a non-magnetic side gap material;
forming a side shield defining mask having an opening configured to define a side shield;
depositing a magnetic material into the opening in the side shield defining mask to form first and second magnetic side shields;
removing the side shield defining mask;
depositing a non-magnetic fill layer;
performing a chemical mechanical polishing;
performing an ion milling to remove a portion of the non-magnetic side gap layer that extends over the write pole;
forming a tapered trailing edge surface on the write pole;
depositing a non-magnetic trailing nap layer; and
forming a trailing shield over the non-magnetic trailing gap layer;
wherein the forming a tapered trailing edge surface on the write pole further comprises, after performing the chemical mechanical polishing:
depositing a step layer;
forming a taper mask over the step layer;
performing an ion milling to remove a portion of the step layer and magnetic write pole material to form the tapered surface on the trailing edge of the magnetic write pole material; and
further comprising, after performing an ion milling to remove a portion of the step layer and write pole material, depositing a non-magnetic bump material, and performing a second ion milling to remove a portion of the non-magnetic bump material, leaving a non-magnetic bump feature.

7. The method as in claim 6 further comprising after performing the second ion milling to remove a portion of the non-magnetic hump material to leave a non-magnetic bump feature, performing a further ion milling to remove a further portion of the magnetic write pole to further taper the trailing edge of the magnetic write pole.

8. The method as in claim 1 wherein the magnetic material deposited into the opening, in the side shield mask is a different material than the material used to form the trailing magnetic shield.

9. The method as in claim 1 wherein the magnetic material deposited into the opening in the side shield mask has a lower magnetic moment than the material used to form the trailing magnetic shield.

10. A method for manufacturing a magnetic write head, comprising:
depositing a magnetic write pole material;
forming a write pole defining mask structure over the magnetic write pole material;
performing an ion milling to remove a portion of the magnetic write pole material, thereby forming a magnetic write pole;
depositing a non-magnetic side gap material;
forming a side shield defining mask having an opening configured to define a side shield;
depositing a magnetic material into the opening in the side shield defining mask to form first and second magnetic side shields;
removing the side shield defining mask;
depositing a non-magnetic fill layer;
performing a chemical mechanical polishing;
performing an ion milling to remove a portion of the non-magnetic side gap layer that extends over the write pole;
forming a tapered trailing edge surface on the write pole;
depositing a non-magnetic trailing gap layer; and
forming a trailing shield over the non-magnetic trailing gap layer; and
wherein the opening in the side shield defining mask has a depth measured from an air bearing surface plane that defines a throat height of a side shield; and wherein the trailing magnetic shield has a throat height that is different from the throat height of the side shield.

11. The method as in claim 1 wherein the chemical mechanical polishing is performed sufficiently to expose a portion of the non-magnetic side gap material.

12. The method as in claim 1 wherein the non-magnetic trailing gap layer separates the trailing magnetic shield from the magnetic side shield.

13. The method as in claim 1 wherein the non-magnetic trailing gap layer is formed so as to separate the magnetic write pole from the trailing magnetic shield, mid also to allow a portion of the trailing magnetic shield to contact a portion of each of the first and second magnetic side shields.

14. The method as in claim 1 further comprising, after depositing the non-magnetic trailing gap layer, forming a mask structure over the non-magnetic trailing gap layer, the mask structure leaving an area over the write pole covered, but leaving an area over the first and second side shields uncovered, and then performing an ion milling to remove the uncovered portions of the non-magnetic trailing gap material.

15. A method for manufacturing a magnetic write head, comprising:
depositing a magnetic write pole material;
forming a write pole defining mask structure over the magnetic write pole material;
performing an ion milling to remove a portion of the magnetic write pole material, thereby forming a magnetic write pole;
depositing a non-magnetic side gap material;
forming a side shield defining mask having an opening configured to define a side shield;
depositing a magnetic material into the opening in the side shield defining mask to form first and second magnetic side shields;
removing the side shield defining mask;
depositing a non-magnetic fill layer;
performing a chemical mechanical polishing;
performing an ion milling to remove a portion of the non-magnetic side gap layer that extends over the write pole;
forming a tapered trailing edge surface on the write pole;
depositing a non-magnetic trailing gap layer; and forming a trailing shield over the non-magnetic trailing gap layer; and further comprising, after depositing the non-magnetic side gap material, and before forming the side shield defining mask:
depositing $Al_2O_3$;
performing a chemical mechanical polishing; and
performing a reactive ion etching to remove most of the $Al_2O_3$, leaving an $Al_2O_3$ side wall formed on first and second side portions of the non-magnetic side gap layer, the $Al_2O_3$ side wall having a vertical outer side.

16. The method as in claim 15, wherein the $Al_2O_3$ is deposited by atomic layer deposition.

17. The method as in claim 15, wherein the reactive ion etching is performed in an $BCL_3/Cl_2$ chemistry.

18. A method for manufacturing a magnetic write head, comprising:
depositing a non-magnetic layer comprising Cr, NiCr, Ru or $Al_2O_3$, and forming a tapered surface on the non-magnetic material
after depositing the non-magnetic layer, and forming a tapered surface on the non-magnetic material, depositing a magnetic write pole material, at least a portion of the magnetic write pole material being deposited over the tapered surface of the non-magnetic material;
forming a write pole defining mask structure over the magnetic write pole material;
performing an ion milling to remove a portion of the magnetic write pole material, thereby forming a magnetic write pole;
depositing a non-magnetic side gap material;
forming a side shield defining mask having an opening configured to define a side shield;
depositing a magnetic material into the opening in the side shield defining mask to form first and second magnetic side shields;
removing the side shield defining mask;
depositing a non-magnetic fill layer;
performing a chemical mechanical polishing;
performing an ion milling to remove a portion of the non-magnetic side gap layer that extends over the write pole;
forming a tapered trailing edge surface on the write pole;
depositing a non-magnetic trailing gap layer; and
forming a trailing shield over the non-magnetic trailing gap layer.

19. A method for manufacturing a magnetic write head, comprising:
depositing a non-magnetic layer, and forming a tapered surface on the non-magnetic material
after depositing the non-magnetic layer, and forming a tapered surface on the non-magnetic material, depositing a magnetic write pole material, at least a portion of the magnetic write pole material being deposited over the tapered surface of the non-magnetic material;
forming a write pole defining mask structure over the magnetic write pole material;
performing an ion milling to remove a portion of the magnetic write pole material, thereby forming a magnetic write pole;
depositing a non-magnetic side gap material;
forming a side shield defining mask having an opening configured to define a side shield;
depositing a magnetic material into the opening in the side shield defining mask to form first and second magnetic side shields;
removing the side shield defining mask;
depositing a non-magnetic fill layer;
performing a chemical mechanical polishing;
performing an ion milling to remove a portion of the non-magnetic side gap layer that extends over the write pole;
forming a tapered trailing edge surface on the write pole;
depositing a non-magnetic trailing gap layer; and
forming a trailing shield over the non-magnetic trailing gap layer;
wherein the tapered surface of the non-magnetic material has an angle of 20 to 40 degrees with respect to a plane of the as deposited magnetic material layer.

20. The method as in claim 4 wherein the step layer forms a tapered trailing edge of the write pole, and wherein the step layer and the magnetic write pole material are formed by electroplating.

21. A method for manufacturing a magnetic write head, comprising:
depositing a magnetic write pole material;
forming a write pole defining mask structure over the magnetic write pole material;
performing an ion milling to remove a portion of the magnetic write pole material, thereby forming a magnetic write pole;
depositing a non-magnetic side gap material;
forming a side shield defining mask having an opening configured to define side shield;
depositing a magnetic material into the opening in the side shield defining mask to form first and second magnetic side shields;
removing the side shield defining mask;
depositing a non-magnetic fill layer;
performing a chemical mechanical polishing;
performing an ion milling to remove a portion of the non-magnetic side gap layer that extends over the write pole;
forming a tapered trailing edge surface on the write pole;
depositing a non-magnetic trailing gap layer; and
forming a trailing shield over the non-magnetic trailing gap layer;
wherein the forming a tapered trailing edge surface on the write pole further comprises, after performing the chemical mechanical polishing:
depositing a step layer;
forming a taper mask over the step layer;
performing an ion milling to remove a portion of the step layer and magnetic write pole material to form the tapered surface on the trailing edge of the magnetic write pole material; and
wherein the step layer comprises a magnetic material which serves as portion of the write pole;
wherein the step layer forms a tapered trailing edge of the write pole, and wherein the step layer and the magnetic write pole material are deposited by sputter deposition or ion beam deposition.

22. A method for manufacturing a magnetic write head, comprising:
depositing a magnetic write pole material;
forming a write pole defining mask structure over the magnetic write pole material;
performing an ion milling to remove a portion of the magnetic write pole material, thereby forming a magnetic write pole;
depositing a non-magnetic side gap material;
forming a side shield defining mask having an opening configured to define a side shield;
depositing a magnetic material into the opening in the side shield defining mask to form first and second magnetic side shields;
removing the side shield defining mask;

depositing a non-magnetic fill layer;
performing a chemical mechanical polishing;
performing an ion milling to remove a portion of the non-magnetic side gap layer that extends over the write pole;
forming a tapered trailing edge surface on the write pole;
depositing a non-magnetic trailing gap layer; and
forming a trailing shield over the non-magnetic trailing gap layer;
wherein the forming a tapered trailing edge surface on the write pole further comprises, after performing the chemical mechanical polishing:
  depositing a step layer;
  forming a taper mask over the step layer;
  performing an ion milling to remove a portion of the step layer and magnetic write pole material to form the tapered surface on the trailing edge of the magnetic write pole material; and
wherein the step layer comprises a magnetic material which serves as portion of the write pole; and
wherein the step layer forms a tapered trailing edge of the write pole, and wherein the step layer and the magnetic write pole material are high magnetic moment magnetic materials.

* * * * *

UNITED STATES PATENT AND TRADEMARK OFFICE
CERTIFICATE OF CORRECTION

PATENT NO. : 8,347,489 B2
APPLICATION NO. : 12/874116
DATED : January 8, 2013
INVENTOR(S) : Hong et al.

It is certified that error appears in the above-identified patent and that said Letters Patent is hereby corrected as shown below:

Column 11, line 4, please replace "mite pole" with --write pole--
    Column 12, line 37, please replace "shield mid" with --shield and--
    Column 14, line 25, please insert --a-- after "define" and before "side"

Signed and Sealed this
Ninth Day of April, 2013

Teresa Stanek Rea
*Acting Director of the United States Patent and Trademark Office*